US008908766B2

(12) United States Patent
Pace

(10) Patent No.: US 8,908,766 B2
(45) Date of Patent: Dec. 9, 2014

(54) COMPUTER METHOD AND APPARATUS FOR PROCESSING IMAGE DATA

(75) Inventor: Charles P. Pace, North Chittenden, VT (US)

(73) Assignee: Euclid Discoveries, LLC, Concord, MA (US)

( * ) Notice: Subject to any disclaimer, the term of this patent is extended or adjusted under 35 U.S.C. 154(b) by 1059 days.

(21) Appl. No.: 12/522,322

(22) PCT Filed: Jan. 4, 2008

(86) PCT No.: PCT/US2008/000090
§ 371 (c)(1),
(2), (4) Date: Jul. 7, 2009

(87) PCT Pub. No.: WO2008/091483
PCT Pub. Date: Jul. 31, 2008

(65) Prior Publication Data
US 2010/0008424 A1 Jan. 14, 2010

Related U.S. Application Data

(63) Continuation-in-part of application No. 11/396,010, filed on Mar. 31, 2006, now Pat. No. 7,457,472, which (Continued)

(51) Int. Cl.
H04N 7/12 (2006.01)
H04N 11/02 (2006.01)
(Continued)

(52) U.S. Cl.
CPC ... *H04N 19/00593* (2013.01); *H04N 19/00945* (2013.01); *H04N 19/00169* (2013.01); *H04N 19/004* (2013.01); *H04N 19/00157* (2013.01)
USPC .................................................. 375/240.16

(58) Field of Classification Search
CPC ............... H04N 19/00036; H04N 19/0066; H04N 19/00696; H04N 19/00715
USPC .................................................. 375/240.16
See application file for complete search history.

(56) References Cited

U.S. PATENT DOCUMENTS 5,117,287 A 5/1992 Koike et al.
(Continued)

FOREIGN PATENT DOCUMENTS

EP 0 614 318 A2 9/1994
(Continued)

OTHER PUBLICATIONS

Notification Concerning Transmittal of International Preliminary Report on Patentability, in International Application No. PCT/US2008/000092, pp. 9, mailed Aug. 6, 2009.
(Continued)

*Primary Examiner* — Jeremaiah C Hallenbeck-Huber
(74) *Attorney, Agent, or Firm* — Hamilton, Brook, Smith & Reynolds, P.C.

(57) ABSTRACT

A method and apparatus for image data compression includes detecting a portion of an image signal that uses a disproportionate amount of bandwidth compared to other portions of the image signal. The detected portion of the image signal result in determined components of interest. Relative to certain variance, the method and apparatus normalize the determined components of interest to generate an intermediate form of the components of interest. The intermediate form represents the components of interest reduced in complexity by the certain variance and enables a compressed form of the image signal where the determined components of interest maintain saliency. In one embodiment, the video signal is a sequence of video frames. The step of detecting includes any of: (i) analyzing image gradients across one or more frames where image gradient is a first derivative model and gradient flow is a second derivative, (ii) integrating finite differences of pels temporally or spatially to form a derivative model, (iii) analyzing an illumination field across one or more frames, and (iv) predictive analysis, to determine bandwidth consumption. The determined bandwidth consumption is then used to determine the components of interest.

29 Claims, 16 Drawing Sheets

Related U.S. Application Data is a continuation-in-part of application No. 11/336,366, filed on Jan. 20, 2006, now Pat. No. 7,436,981, which is a continuation-in-part of application No. 11/280,625, filed on Nov. 16, 2005, now Pat. No. 7,457,435, which is a continuation-in-part of application No. 11/230,686, filed on Sep. 20, 2005, now Pat. No. 7,426,285, which is a continuation-in-part of application No. 11/191,562, filed on Jul. 28, 2005, now Pat. No. 7,158,680.

(60) Provisional application No. 60/881,966, filed on Jan. 23, 2007, provisional application No. 60/811,890, filed on Jun. 9, 2006, provisional application No. 60/667,532, filed on Mar. 31, 2005, provisional application No. 60/670,951, filed on Apr. 13, 2005.

(51) Int. Cl.
*H04N 11/04* (2006.01)
*H04N 19/527* (2014.01)
*H04N 19/90* (2014.01)
*H04N 19/146* (2014.01)
*H04N 19/23* (2014.01)
*H04N 19/14* (2014.01)

(56) References Cited

U.S. PATENT DOCUMENTS

| | | | |
|---|---|---|---|
| 5,710,590 A | 1/1998 | Ichige et al. | |
| 5,760,846 A | 6/1998 | Lee | |
| 5,774,591 A | 6/1998 | Black et al. | |
| 5,774,595 A | 6/1998 | Kim | |
| 5,826,165 A | 10/1998 | Echeita et al. | |
| 5,917,609 A | 6/1999 | Breeuwer et al. | |
| 5,933,535 A | 8/1999 | Lee et al. | |
| 5,969,755 A | 10/1999 | Courtney | |
| 5,991,447 A * | 11/1999 | Eifrig et al. | 382/236 |
| 6,044,168 A | 3/2000 | Tuceryan et al. | |
| 6,061,400 A | 5/2000 | Pearlstein et al. | |
| 6,088,484 A | 7/2000 | Mead | |
| 6,256,423 B1 * | 7/2001 | Krishnamurthy et al. | 382/251 |
| 6,307,964 B1 | 10/2001 | Lin et al. | |
| 6,546,117 B1 | 4/2003 | Sun et al. | |
| 6,574,353 B1 | 6/2003 | Schoepflin | |
| 6,608,935 B2 * | 8/2003 | Nagumo et al. | 382/233 |
| 6,611,628 B1 | 8/2003 | Sekiguchi et al. | |
| 6,614,466 B2 | 9/2003 | Thomas | |
| 6,625,310 B2 | 9/2003 | Lipton et al. | |
| 6,625,316 B1 | 9/2003 | Maeda | |
| 6,661,004 B2 | 12/2003 | Aumond et al. | |
| 6,711,278 B1 | 3/2004 | Gu et al. | |
| 6,731,799 B1 | 5/2004 | Sun et al. | |
| 6,731,813 B1 | 5/2004 | Stewart | |
| 6,738,424 B1 | 5/2004 | Allmen et al. | |
| 6,751,354 B2 | 6/2004 | Foote et al. | |
| 6,774,917 B1 | 8/2004 | Foote et al. | |
| 6,792,154 B1 | 9/2004 | Stewart | |
| 6,870,843 B1 | 3/2005 | Stewart | |
| 6,909,745 B1 | 6/2005 | Puri et al. | |
| 6,912,310 B1 | 6/2005 | Park et al. | |
| 6,925,122 B2 | 8/2005 | Gorodnichy | |
| 6,950,123 B2 | 9/2005 | Martins | |
| 7,003,117 B2 | 2/2006 | Kacker et al. | |
| 7,027,599 B1 | 4/2006 | Entwistle | |
| 7,043,058 B2 | 5/2006 | Cornog et al. | |
| 7,088,845 B2 | 8/2006 | Gu et al. | |
| 7,158,680 B2 | 1/2007 | Pace | |
| 7,162,055 B2 | 1/2007 | Gu et al. | |
| 7,162,081 B2 | 1/2007 | Timor et al. | |
| 7,164,718 B2 | 1/2007 | Maziere et al. | |
| 7,173,925 B1 | 2/2007 | Dantu et al. | |
| 7,184,073 B2 | 2/2007 | Varadarajan et al. | |
| 7,352,386 B1 | 4/2008 | Shum et al. | |
| 7,356,082 B1 | 4/2008 | Kuhn | |
| 7,415,527 B2 | 8/2008 | Varadarajan et al. | |
| 7,424,157 B2 | 9/2008 | Pace | |
| 7,424,164 B2 | 9/2008 | Gondek et al. | |
| 7,426,285 B2 | 9/2008 | Pace | |
| 7,436,981 B2 | 10/2008 | Pace | |
| 7,457,435 B2 | 11/2008 | Pace | |
| 7,457,472 B2 | 11/2008 | Pace et al. | |
| 7,508,990 B2 | 3/2009 | Pace | |
| 7,574,406 B2 | 8/2009 | Varadarajan et al. | |
| 7,606,305 B1 | 10/2009 | Rault | |
| 7,630,522 B2 | 12/2009 | Popp et al. | |
| 7,715,597 B2 * | 5/2010 | Costache et al. | 382/118 |
| 7,788,191 B2 * | 8/2010 | Jebara | 706/12 |
| 8,019,170 B2 * | 9/2011 | Wang et al. | 382/239 |
| 8,036,464 B2 | 10/2011 | Sridhar et al. | |
| 8,065,302 B2 | 11/2011 | Sridhar et al. | |
| 8,068,677 B2 | 11/2011 | Varadarajan et al. | |
| 8,086,692 B2 | 12/2011 | Sridhar et al. | |
| 8,090,670 B2 | 1/2012 | Sridhar et al. | |
| 8,140,550 B2 | 3/2012 | Varadarajan et al. | |
| 8,243,118 B2 | 8/2012 | Pace | |
| 8,259,794 B2 | 9/2012 | Bronstein et al. | |
| 8,290,038 B1 | 10/2012 | Wang et al. | |
| 2001/0038714 A1 | 11/2001 | Masumoto et al. | |
| 2002/0016873 A1 | 2/2002 | Gray et al. | |
| 2002/0054047 A1 | 5/2002 | Toyama et al. | |
| 2002/0059643 A1 | 5/2002 | Kitamura et al. | |
| 2002/0073109 A1 | 6/2002 | Toriumi | |
| 2002/0085633 A1 | 7/2002 | Kim et al. | |
| 2002/0114392 A1 | 8/2002 | Sekiguchi et al. | |
| 2002/0116529 A1 | 8/2002 | Hayden | |
| 2002/0164068 A1 | 11/2002 | Yan | |
| 2002/0196328 A1 | 12/2002 | Piotrowski | |
| 2003/0011589 A1 | 1/2003 | Desbrun et al. | |
| 2003/0058943 A1 | 3/2003 | Zakhor et al. | |
| 2003/0063778 A1 | 4/2003 | Rowe et al. | |
| 2003/0103647 A1 | 6/2003 | Rui et al. | |
| 2003/0112243 A1 | 6/2003 | Garg et al. | |
| 2003/0122966 A1 | 7/2003 | Markman et al. | |
| 2003/0163690 A1 | 8/2003 | Stewart | |
| 2003/0194134 A1 | 10/2003 | Wenzel et al. | |
| 2003/0195977 A1 | 10/2003 | Liu et al. | |
| 2003/0206589 A1 | 11/2003 | Jeon | |
| 2003/0231769 A1 | 12/2003 | Bolle et al. | |
| 2003/0235341 A1 | 12/2003 | Gokturk et al. | |
| 2004/0013286 A1 | 1/2004 | Viola et al. | |
| 2004/0017852 A1 | 1/2004 | Garrido et al. | |
| 2004/0022320 A1 | 2/2004 | Kawada et al. | |
| 2004/0028139 A1 | 2/2004 | Zaccarin et al. | |
| 2004/0085315 A1 | 5/2004 | Duan et al. | |
| 2004/0107079 A1 | 6/2004 | MacAuslan | |
| 2004/0113933 A1 | 6/2004 | Guier | |
| 2004/0135788 A1 | 7/2004 | Davidson et al. | |
| 2004/0246336 A1 | 12/2004 | Kelly, III et al. | |
| 2004/0264574 A1 | 12/2004 | Lainema | |
| 2005/0015259 A1 | 1/2005 | Thumpudi et al. | |
| 2005/0128306 A1 | 6/2005 | Porter et al. | |
| 2005/0185823 A1 | 8/2005 | Brown et al. | |
| 2005/0193311 A1 | 9/2005 | Das et al. | |
| 2006/0013450 A1 | 1/2006 | Shan et al. | |
| 2006/0029253 A1 | 2/2006 | Pace | |
| 2006/0045185 A1 | 3/2006 | Kiryati | |
| 2006/0067585 A1 | 3/2006 | Pace | |
| 2006/0120571 A1 | 6/2006 | Tu et al. | |
| 2006/0133681 A1 | 6/2006 | Pace | |
| 2006/0177140 A1 | 8/2006 | Pace | |
| 2006/0233448 A1 | 10/2006 | Pace et al. | |
| 2006/0274949 A1 | 12/2006 | Gallagher et al. | |
| 2007/0025373 A1 | 2/2007 | Stewart | |
| 2007/0071336 A1 | 3/2007 | Pace | |
| 2007/0153025 A1 | 7/2007 | Mitchell et al. | |
| 2007/0183661 A1 * | 8/2007 | El-Maleh et al. | 382/173 |
| 2007/0185946 A1 | 8/2007 | Basri et al. | |
| 2007/0268964 A1 | 11/2007 | Zhao | |
| 2008/0027917 A1 | 1/2008 | Mukherjee et al. | |
| 2008/0040375 A1 | 2/2008 | Vo et al. | |
| 2008/0101652 A1 | 5/2008 | Zhao et al. | |

(56) References Cited

U.S. PATENT DOCUMENTS

| | | | |
|---|---|---|---|
| 2008/0152008 A1 | 6/2008 | Sun et al. |
| 2008/0232477 A1 | 9/2008 | Wang et al. |
| 2008/0240247 A1 | 10/2008 | Lee et al. |
| 2009/0040367 A1 | 2/2009 | Zakrzewski et al. |
| 2009/0055417 A1 | 2/2009 | Hannuksela |
| 2009/0067719 A1 | 3/2009 | Sridhar et al. |
| 2009/0080855 A1 | 3/2009 | Senftner et al. |
| 2009/0112905 A1 | 4/2009 | Mukerjee et al. |
| 2009/0129474 A1 | 5/2009 | Pandit et al. |
| 2009/0158370 A1 | 6/2009 | Li et al. |
| 2009/0262804 A1 | 10/2009 | Pandit et al. |
| 2009/0292644 A1 | 11/2009 | Varadarajan et al. |
| 2010/0027861 A1 | 2/2010 | Shekhar et al. |
| 2010/0049739 A1 | 2/2010 | Varadarajan et al. |
| 2010/0073458 A1 | 3/2010 | Pace |
| 2010/0074600 A1 | 3/2010 | Putterman et al. |
| 2010/0086062 A1 | 4/2010 | Pace |
| 2010/0088717 A1 | 4/2010 | Candelore et al. |
| 2010/0135590 A1 | 6/2010 | Yang et al. |
| 2010/0167709 A1 | 7/2010 | Varadarajan |
| 2010/0272185 A1 | 10/2010 | Gao et al. |
| 2010/0278275 A1 | 11/2010 | Yang et al. |
| 2010/0316131 A1 | 12/2010 | Shanableh et al. |
| 2010/0322300 A1 | 12/2010 | Li et al. |
| 2010/0322309 A1 | 12/2010 | Huang et al. |
| 2011/0019026 A1 | 1/2011 | Kameyama |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1 | 7/2011 | Pace |
| 2011/0221865 A1 | 9/2011 | Hyndman |
| 2011/0285708 A1 | 11/2011 | Chen et al. |
| 2011/0286627 A1 | 11/2011 | Takacs et al. |
| 2012/0044226 A1 | 2/2012 | Singh et al. |
| 2012/0079004 A1 | 3/2012 | Herman |
| 2012/0105654 A1 | 5/2012 | Kwatra et al. |
| 2012/0155536 A1 | 6/2012 | Pace |
| 2012/0163446 A1 | 6/2012 | Pace |
| 2012/0281063 A1 | 11/2012 | Pace |
| 2013/0027568 A1 | 1/2013 | Zou et al. |
| 2013/0035979 A1 | 2/2013 | Tenbrock |
| 2013/0083854 A1 | 4/2013 | Pace |
| 2013/0107948 A1 | 5/2013 | DeForest et al. |
| 2013/0170541 A1 | 7/2013 | Pace et al. |
| 2013/0230099 A1 | 9/2013 | DeForest et al. |

FOREIGN PATENT DOCUMENTS

| | | |
|---|---|---|
| EP | 1 124 379 A2 | 8/2001 |
| EP | 1 426 898 A2 | 6/2004 |
| EP | 1 779 294 A2 | 5/2007 |
| JP | 2003-253190 | 11/1991 |
| JP | 5-244585 A | 9/1993 |
| JP | 07-038873 | 2/1995 |
| JP | 2007-095587 | 4/1995 |
| JP | 07-288789 | 10/1995 |
| JP | 08-235383 | 9/1996 |
| JP | 08-263623 | 10/1996 |
| JP | 2001-100731 A | 4/2001 |
| JP | 2001-103493 A | 4/2001 |
| JP | 2002-525735 T | 8/2002 |
| JP | 2004-94917 A | 3/2004 |
| JP | 2004 356747 | 12/2004 |
| JP | 2006-521048 A | 9/2006 |
| TW | 200521885 | 7/2005 |
| TW | 200527327 | 8/2005 |
| WO | WO 98/27515 | 6/1998 |
| WO | WO 98/59497 | 12/1998 |
| WO | WO 99/26415 | 5/1999 |
| WO | WO 00/16563 | 3/2000 |
| WO | WO 00/45600 | 8/2000 |
| WO | WO02 102084 A1 | 12/2002 |
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |
| WO | WO 2006/034308 A2 | 3/2006 |
| WO | WO 2006/055512 A2 | 5/2006 |
| WO | WO 2006/083567 A1 | 8/2006 |
| WO | WO 2006/105470 A1 | 10/2006 |
| WO | WO 2007/007257 A1 | 1/2007 |
| WO | WO 2007/146102 A2 | 12/2007 |
| WO | WO 2008/091483 A2 | 7/2008 |
| WO | WO 2008/091484 A2 | 7/2008 |
| WO | WO 2008/091485 A2 | 7/2008 |
| WO | WO 2010/042486 A1 | 4/2010 |
| WO | WO 2010/118254 | 10/2010 |
| WO | WO 2011/156250 A1 | 12/2011 |
| WO | WO 2012/033970 A1 | 3/2012 |

OTHER PUBLICATIONS

Dodgson, N. A., "Image resampling," Technical Report, UCAM-CL-TR-261, ISSN 1476-2986, University of Cambridge, Computer Laboratory, (264 pp.) (Aug. 1992).

Richardson, I., "Vcodex White Paper: Video Compression Patents," Vcodex Ltd., pp. 3-6 (2008-2011).

Notification Concerning Transmittal of International Preliminary Report on Patentability, in International Application No. PCT/US2008/000091, pp. 9, mailed Aug. 6, 2009.

Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).

Jolliffe, I.T., "Principal Component Analysis, Second Edition," Springer, 518 pp., Apr. 2002.

Jones, M. and P. Viola, "Fast Multi View Face Detection," *Mitsubishi Electrical Laboratories*, Jul. 2003 (10 pp.).

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511 518.

Gunsel, B. et al., "Content based access to video objects: Temporal segmentation, visual summarization, and feature extraction," *Signal Processing*, vol. 66, pp. 261 280 (1998).

Piamsa nga, P. and N. Babaguchi, "Motion estimation and detection of complex object by analyzing resampled movements of parts," in *Proc. ICIP '04*, 1 (365 368), Oct. 2004.

Vidal, R. et al., "Generalized principal component analysis (GPCA)", in *Proc. CVPR '03*, 1 (I621-628), Jun. 2003.

Vidal, R. and R. Hartley, "Motion segmentation with missing data using PowerFactorization and GPCA," in *Proc. CVPR* 04, 2 (II-310-316), Jun.-Jul. 2004.

Huang, R. et al., "Sparse representation of images with hybrid linear models," in *Proc. ICIP '04*, 2(1281 1284) Oct. 2004.

Rong, S. et al., "Efficient spatiotemporal segmentation and video object generation for highway surveillance video," in *Proc. IEEE Int'l, Conf. Communications, Circuits and Systems and West Sino Expositions*, 1(580 584), Jun. Jul. 2002.

Toklu, C. et al., "Simultaneous Alpha Map Generation and 2 D Mesh Tracking for Multimedia Applications," *Proceedings of the International Conference on Image Processing: 1997*, (113 116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Rehg, J. M. and Witkin, A. P., "Visual Tracking with Deformation Models," *Proc. IEEE Int'l. Conf. on Robotics and Automation*, pp. 844-850 (Apr. 1991).

Kass, Michael, Andrew Witzin, and Demetri Terzopoulos, "Snakes: Active contour Models," *International Journal of Computer Vision* (1988).

Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).

(56) References Cited

OTHER PUBLICATIONS

Reinders, M.J.T., et al., "Facial Feature Localization and Adaptation of a Generic Face Model for model-Based Coding," *Signal Processing: Image Communication*, No. 7, pp. 57-74 (1995).

Doenges, P. K., "MPEG-4: Audio/Video and Synthetic Graphics/Audio for Mixed Media," *Signal Processing: Image Communication*, No. 9, pp. 433-463 (1997).

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Extended European Search Report for 06 73 3758.4, dated Mar. 8, 2011 (17 pages).

Extended European Search Report for 06 74 0318.8, dated May 6, 2011 (14 pages).

Fischler, M.A., et al., "Random Sample Consensus: A Paradigm for Model Fitting with Applications to Image Analysis and Automated Cartography," *Communications of the Association for Computing Machinery*, 24(6):381-395 (1981).

Harris, C., et al., "A Combined Corner nad Edge Detector," *Alvey Vision Conference, Proceedings of the Alvey Vision Conference*, p. 147 (1988).

Irani, M., et al., "Detecting and Tracking Multiple Moving Objects Using Temporal Integration," European Conference on Computer Vision, 282-287 (1992).

Notification Concerning Transmittal of the International Preliminary Report on Patentability for PCT/US2009/059653, mailed Apr. 21, 2011 (10 pages).

Park, et al., "Qualitative Estimation of Camera Motion Parameters From the Linear Composition of Optical Flow," Pattern Recognition: The Journal of the Pattern Recognition Society, 37:767-779 (2004).

Pique, R. et al., "Efficient Face Coding in Video Sequences Combining Adaptive Principal Component Analysis and a Hybrid Codec Approach," *Proceedings of International Conference on Acoustics, Speech and Signal Processing*, 3:629-632(2003).

Schröder, K., et al., "Combined Description of Shape and Motion in an Object Based Coding Scheme Using Curved Triangles," *Proceedings of the International Conference on Image Processing*, 2:390-393 (1995).

Tabatabai, A. J., et al., "Motion Estimation Methods for Video Compression—A Review," *Journal of the Franklin Institute*, 335(8): 1411-1441 (1998).

Wang, Y., "Use of Two-Dimensional Deformable Mesh Structures for Video Coding, Part I—The Synthesis Problem: Mesh-Based Function Approximation and Mapping" *IEEE Transactions on Circuits and Systems for Video Technology*, 6(6):1051-8215 (1996).

Shin, J. et al., "Optical flow-based real-time object tracking using non-prior training active feature model," *Academic Press Limited*, GB, vol. 11, No. 3, pp. 204-218 (Jun. 1, 2005).

Cho, J-H., et al., "Object detection using multi-resolution mosaic in image sequences," *Signal Processing. Image Communication*, Elsevier Science Publishers, Amsterdam, vol. 20, No. 3, pp. 233-253, (Mar. 1, 2005).

Gorodinchy, et al., "Seeing faces in video by computers. Editorial for Special Issue on Face Processing in Video Sequences," *Image and Vision Computing*, Guilford, GB, vol. 24, No. 6, pp. 551-556 (Jun. 1, 2006).

Miners, B. W., et al., "Dynamic Facial Expression Recognition Using Fuzzy Hidden Markov Models," *Systems, Man and Cybernetics, 2005 IEEE International Conference on, IEEE*, Piscataway, N.J., USA, vol. 2, pp. 1417-1422 (Oct. 10, 2005).

Invitation to Pay Additional Fees and, Where Applicable, Protest Fee, for International Application No. PCT/US2008/000090, mailed Jun. 2, 2010.

Notification Concerning Transmittal of International Preliminary Report on Patentability (Chapter I of the Patent Cooperation Treaty), for International Application No. PCT/US2008/00090, mailed Sep. 2, 2010.

Antoszczyszyn, P.M., et al., "Tracking of the Motion of Important Facial Features in Model-Based Coding," *Signal Processing*, 66(2):249-260, (Apr. 30, 1998).

Fukuhara, T., et al., "3-D Motion Estimation of Human Head for Model-Based Image Coding," *IEEE Proceedings-I*, 140(1):26-35, (Feb. 1, 1993).

International Search Report for International Application No. PCT/US2009/059653, 8 pp., mailed Feb. 2, 2010.

Written Opinion of the International Searching Authority for International Application No. PCT/US2009/059653, 8 pp., mailed Feb. 2, 2010.

Amit, Yali, *2D Object Detection and Recognition: Models, Algorithms, and Networks*, The MIT Press, Cambridge, Massachusetts, pp. 147-149 (Sections 7.3: Detecting Pose and 7.4: Bibliographical Notes and Discussion) (2002).

Huang, T.S. et al., "Chapter 5: Three-Dimensional Model-Based Image Communication," *Visual Information Representation, Communication, and Image Processing*, Editors: Chen, Chang Wen, et al., Marcel Dekker, Inc., New York, New York, pp. 97-117 (1999).

Notification of Transmittal of the International Search Report and the Written Opinion of the International Searching Authority, or the Declaration, for International Application No. PCT/US2008/000090, 19 pp., mailed Aug. 18, 2010.

Bay, H., et al., "SURF: Speeded Up Robust Features", ETH Zurich {bay, vangool}@vision.ee.ethz.ch, 1-14 (Date Not Provided).

Lowe, D.G., "Distinctive Image Features from Scale-Invariant Keypoints", International Journal of Computer Vision, 1-28 (2004).

Pati, Y.C., et al., "Orthogonal Matching Pursuit: Recursive Function Approximation with Applications to Wavelet Decomposition", 27th Annual Asilomar conference on Signals systems and Computers ,1-5 (1993).

Wiegand, T., et al., "Overview of the H.264/AVC Video Coding Standard", IEEE Transactions on Circuits and Systems for Video Technology, 13(7):560-576 (2003).

"Series H: Audiovisual and Multimedia Systems: Infrastructure of audiovisual services—Coding of moving video; Advanced video coding for generic audiovisual services", ITU-T, H.264: 1-657 (2012).

Garrett-Glaser, J., "Diary of an x264 Developer", http://x264dev.multimedia.cx/, 1-7 (2008).

Brenneman, A., et al., "x264", Wikipedia—The Free Encyclopedia: http://en.wikipedia,org/wiki/X264, 1-5 (Date Not Provided).

"H.264/MPEG-4 AVC", Wikipedia—The Free Encyclopedia: http:.//en.wikipedia,org/wiki/X264, 1-17 (Date Not Provided).

OpenCV Documentation Page, http://docs.opencv.org/ (Retrieved on Dec. 21, 2012).

Intel Integrated Performance Primitives—Documentation, http://software.intel.com/en-us/articles/intel-integrated-performance-primitives-documentation/ (Retrieved on Dec. 21, 2012).

Viola, P. and Jones, M.J., "Robust Real-Time Face Detection," International Journal of Computer Vision, 20(17):138-153 (2004).

"Bit-Torrent: Introduction", Retrieved on: Jan. 18, 2006, retrieved online at: http ://web.archive.org/web/20060118042451/http://www.bittorrent.com/introduction.html.

Office Action from U.S. Appl. No. 13/341,437, dated Nov. 20, 2012.

Office Action from U.S. Appl. No. 12/522,357, dated Dec. 12, 2012.

Ebrahimi, T., et al. "MPEG-4 natural video coding—An Overview", Signal Processing: Image Communication 15:365-385 (2000).

Notification and Transmittal of International Search Report and Written Opinion dated Jun. 10, 2013 for PCT/US2013/029297, entitled "Video Compression Repository and Model Reuse".

Zhang, et al., "A Novel Video Coding Framework by Perceptual Representation and Macroblock-Based Matching Pursuit Algorithm", Department of Computer Science and Technology, pp. 322-331 (2007).

Osama, et al., "Video Compression Using Matching Pursuits", *IEEE Transactions on Circuits and Systems for Video Technology*, vol. 9, No. 1, Feb. 1999.

Neff, et al., "Matching-Pursuit Based Video Compression", *Department of Electrical Engineering and Computer Science*, MPEG Meeting, Mar. 11, 1995.

Keysers, et al., "Deformation Models for Image Recognition," IEEE Transactions on Pattern Analysis and Machine Intelligence, 29(8):1422-1435 (2007).

\* cited by examiner

Object Interpolation

COMPUTER METHOD AND APPARATUS FOR PROCESSING IMAGE DATA

RELATED APPLICATIONS

This application is the U.S. National Stage of International Application No. PCT/US2008/000090, filed Jan. 4, 2008, which designates the U.S., published in English, and claims the benefit of U.S. Provisional Application No. 60/881,966, filed Jan. 23, 2007. This application is related to U.S. Provisional Application No. 60/811,890, filed Jun. 9, 2006. This application is also a continuation-in-part of U.S. application Ser. No. 11/396,010, filed Mar. 31, 2006, now U.S. Pat. No. 7,457,472 which is a continuation-in-part of U.S. application Ser. No. 11/336,366 filed Jan. 20, 2006, now U.S. Pat. No. 7,436,981 which is a continuation-in-part of U.S. application Ser. No. 11/280,625 filed Nov. 16, 2005 now U.S. Pat. No. 7,457,435 which is a continuation-in-part of U.S. application Ser. No. 11/230,686 filed Sep. 20, 2005 now U.S. Pat. No. 7,426,285 which is a continuation-in-part of U.S. application Ser. No. 11/191,562 filed Jul. 28, 2005, now U.S. Pat. No. 7,158,680. U.S. application Ser. No. 11/396,010 also claims priority to U.S. Provisional Application No. 60/667,532, filed Mar. 31, 2005 and U.S. Provisional Application No. 60/670,951, filed Apr. 13, 2005. The entire teachings of the above applications are incorporated herein by reference.

FIELD OF THE INVENTION

The present invention is generally related to the field of digital signal processing, and more particularly, to computer apparatus and computer-implemented methods for the efficient representation and processing of signal or image data, and most particularly, video data.

BACKGROUND OF THE INVENTION

The general system description of the prior art in which the current invention resides can be expressed as in FIG. 1. Here a block diagram displays the typical prior art video processing system. Such systems typically include the following stages: an input stage 102, a processing stage 104, an output stage 106 and one or more data storage mechanisms 108.

The input stage 102 may include elements such as camera sensors, camera sensor arrays, range finding sensors or a means of retrieving data from a storage mechanism. The input stage provides video data representing time correlated sequences of man made and/or naturally occurring phenomena. The salient component of the data may be masked or contaminated by noise or other unwanted signals.

The video data, in the form of a data stream, array or packet, may be presented to the processing stage 104 directly or through an intermediate storage element 108 in accordance with a predefined transfer protocol. The processing stage may take the form of dedicated analog or digital devices or programmable devices such as central processing units (CPUs), digital signal processors (DSPs) or field programmable gate arrays (FPGAs) to execute a desired set of video data processing operations. The processing stage 104 typically includes one or more CODECs (COder/DECoders).

Output stage 106 produces a signal, display or other response which is capable of affecting a user or external apparatus. Typically, an output device is employed to generate an indicator signal, a display, a hard copy, a representation of processed data in storage or to initiate transmission of data to a remote site. It may also be employed to provide an intermediate signal or control parameter for use in subsequent processing operations.

Storage is presented as an optional element in this system. When employed, storage element 108 may be either non-volatile, such as read-only storage media, or volatile, such as dynamic random access memory (RAM). It is not uncommon for a single video processing system to include several types of storage elements, with the elements having various relationships to the input, processing and output stages. Examples of such storage elements include input buffers, output buffers and processing caches.

The primary objective of the video processing system in FIG. 1 is to process input data to produce an output which is meaningful for a specific application. In order to accomplish this goal, a variety of processing operations may be utilized, including noise reduction or cancellation, feature extraction, object segmentation and/or normalization, data categorization, event detection, editing, data selection, data re-coding and transcoding.

Many data sources that produce poorly constrained data are of importance to people, especially sound and visual images. In most cases the essential characteristics of these source signals adversely impact the goal of efficient data processing. The intrinsic variability of the source data is an obstacle to processing the data in a reliable and efficient manner without introducing errors arising from naive empirical and heuristic methods used in deriving engineering assumptions. This variability is lessened for application when the input data are naturally or deliberately constrained into narrowly defined characteristic sets (such as a limited set of symbol values or a narrow bandwidth). These constraints all too often result in processing techniques that are of low commercial value.

The design of a signal processing system is influenced by the intended use of the system and the expected characteristics of the source signal used as an input. In most cases, the performance efficiency required will also be a significant design factor. Performance efficiency, in turn, in affected by the amount of data to be processed compared with the data storage available as well as the computational complexity of the application compared with the computing power available.

Conventional video processing methods suffer from a number of inefficiencies which are manifested in the form of slow data communication speeds, large storage requirements and disturbing perceptual artifacts. These can be serious problems because of the variety of ways people desire to use and manipulate video data and because of the innate sensitivity people have for some forms of visual information.

An "optimal" video processing system is efficient, reliable and robust in performing a desired set of processing operations. Such operations may include the storage, transmission, display, compression, editing, encryption, enhancement, categorization, feature detection and recognition of the data. Secondary operations may include integration of such processed data with other information sources. Equally important, in the case of a video processing system, the outputs should be compatible with human vision by avoiding the introduction of perceptual artifacts.

A video processing system may be described as "robust" if its speed, efficiency and quality do not depend strongly on the specifics of any particular characteristics of the input data. Robustness also is related to the ability to perform operations when some of the input is erroneous. Many video processing systems fail to be robust enough to allow for general classes of applications—providing only application so the same narrowly constrained data that was used in the development of the system.

Salient information can be lost in the discretization of a continuous-valued data source due to the sampling rate of the input element not matching the signal characteristics of the sensed phenomena. Also, there is loss when the signal's strength exceeds the sensor's limits, resulting in saturation. Similarly, information is lost when the precision of input data is reduced as happens in any quantization process when the full range of values in the input data is represented by a set of discrete values, thereby reducing the precision of the data representation.

Ensemble variability refers to any unpredictability in a class of data or information sources. Data representative of visual information has a very large degree of ensemble variability because visual information is typically unconstrained. Visual data may represent any spatial array sequence or spatio-temporal sequence that can be formed by light incident on a sensor array.

In modeling visual phenomena, video processors generally impose some set of constraints and/or structure on the manner in which the data is represented or interpreted. As a result, such methods can introduce systematic errors which would impact the quality of the output, the confidence with which the output may be regarded and the type of subsequent processing tasks that can reliably be performed on the data.

Quantization methods reduce the precision of data in the video frames while attempting to retain the statistical variation of that data. Typically, the video data is analyzed such that the distributions of data values are collected into probability distributions. There are also methods that project the data into phase space in order to characterize the data as a mixture of spatial frequencies, thereby allowing precision reduction to be diffused in a less objectionable manner. When utilized heavily, these quantization methods often result in perceptually implausible colors and can induce abrupt pixilation in originally smooth areas of the video frame.

Different coding is also typically used to capitalize on the local spatial similarity of data. Data in one part of the frame tend to be clustered around similar data in that frame, and also in a similar position in subsequent frames. Representing the data in terms of its spatially adjacent data can then be combined with quantization and the net result is that, for a given precision, representing the differences is more accurate than using the absolute values of the data. This assumption works well when the spectral resolution of the original video data is limited, such as in black and white video, or low-color video. As the spectral resolution of the video increases, the assumption of similarity breaks down significantly. The breakdown is due to the inability to selectively preserve the precision of the video data.

Residual coding is similar to differential encoding in that the error of the representation is further differentially encoded in order to restore the precision of the original data to a desired level of accuracy.

Variations of these methods attempt to transform the video data into alternate representations that expose data correlations in spatial phase and scale. Once the video data has been transformed in these ways, quantization and differential coding methods can then be applied to the transformed data resulting in an increase in the preservation of the salient image features. Two of the most prevalent of these transform video compression techniques are the discrete cosine transform (DCT) and the discrete wavelet transform (DWT). Error in the DCT transform manifests in a wide variation of video data values, and therefore, the DCT is typically used on blocks of video data in order to localize these false correlations. The artifacts from this localization often appear along the border of the blocks. For the DWT, more complex artifacts happen when there is a mismatch between the basis function and certain textures, and this causes a blurring effect. To counteract the negative effects of DCT and DWT, the precision of the representation is increased to lower distortion at the cost of precious bandwidth.

SUMMARY OF THE INVENTION

The present invention builds on the subject matter disclosed in the prior related applications by further adding a statistical analysis to determine an approximation of the normalized pel data. This approximation is the "encoded" form of the normalized pel data. The statistical analysis is achieved through a linear decomposition of the normalized pel data, specifically implemented as a Singular Value Decomposition (SVD) which can be generally referred to as Principal Component Analysis (PCA) in this case. The result of this operation is a set of one or more basis vectors. These basis vectors can be used to progressively describe ever more accurate approximations of the normalized pel data. As such, a truncation of one or more of the least significant basis vectors is performed to produce an encoding that is sufficient to represent the normalized pel data to a required quality level.

In general, PCA cannot be effectively applied to the original video frames. But, once the frames have been segmented and further normalized, the variation in the appearance of the pels in those frames no longer has the interference of background pels or the spatial displacements from global motion. Without these two forms of variation in the video frame data, PCA is able to more accurately approximate the appearance of the normalized pel data using fewer basis vectors than it would otherwise. The resulting benefit is a very compact representation, in terms of bandwidth, of the original appearance of the object in the video.

The truncation of basis vectors can be performed in several ways, and each truncation is considered to be a form of precision analysis when combined with PCA itself. This truncation can simply be the described exclusion of entire basis vectors from the set of basis vectors. Alternatively, the vector element and/or element bytes and/or bits of those bytes can be selectively excluded (truncated). Further, the basis vectors themselves can be transformed into alternate forms that would allow even more choices of truncation methods. Wavelet transform using an Embedded Zero Tree truncation is one such form.

Generating normalized pel data and further reducing it to the encoded pel data provides a data representation of the appearance of the pel data in the original video frame. This representation can be useful in and of itself, or as input for other processing. The encoded data may be compact enough to provide an advantageous compression ratio over conventional compression without further processing.

The encoded data may be used in place of the "transform coefficients" in conventional video compression algorithms. In a conventional video compression algorithm, the pel data is "transform encoded" using a Discrete Cosine Transform (DCT). The resulting "transform coefficients" are then further processed using quantization and entropy encoding. Quantization is a way to lower the precision of the individual coefficients. Entropy encoding is a lossless compression of the quantized coefficients and can be thought of in the same sense as zipping a file. The present invention is generally expected to yield a more compact encoded vector than DCT, thereby allowing a higher compression ratio when used in a conventional codec algorithm.

In a preferred embodiment, components of interest (i.e., the interesting portions of a video signal) are determined as a function of disproportionate bandwidth consumption and image gradients over time. The components of interest (determined portions of video signal) are normalized relative to global structure, global motion and pose, local deformation and/or illumination. Such normalization reduces the complexity of the components of interest in a manner that enables application of geometric data analysis techniques with increased effectiveness.

In particular, the video signal is a sequence of frames, the detection of disproportionate bandwidth includes any of:
 (i) analyzing image gradients across one or more frames,
 (ii) integrating finite differences of pels temporally or spatially to form a derivative model, where image gradient is a first derivative and gradient flow is a second derivative,
 (iii) analyzing an illumination field across one or more frames, and
 (iv) predictive analysis,
to determine bandwidth consumption. The determined bandwidth consumption is used to determine the components of interest (or interesting portions of the video signal). The determined components of interest contain structural information including any combination of spatial features and correspondence of spatial features (motion).

In accordance with one aspect of the present invention, the step of normalizing involves forming a structural model and an appearance model of the determined components of interest. The preferred embodiment applies geometric data analysis techniques to at least the appearance model and/or structural model. The reduction in complexity of the components of interest enables application of geometric data analysis in a substantially increased effective manner. The geometric data analysis techniques include any of linear decomposition and nonlinear decomposition. Preferably, linear decomposition employs any of: sequential PCA, power factorization, generalized PCA, and progressive PCA. Progressive PCA may include wavelet transform techniques combined with PCA.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In video signal data frames of video are assembled into a sequence of images usually depicting a three dimensional scene as projected, imaged, onto a two dimensional imaging surface. Each frame, or image, is composed of picture elements (pels) that represent an imaging sensor response to the sampled signal. Often the sampled signal corresponds to come reflected, refracted or emitted energy (e.g., electromagnetic, acoustic, etc.) sampled by a two dimensional sensor array. A successive sequential sampling results in a spatiotemporal data stream with two spatial dimensions per frame and a temporal dimension corresponding to the frame's order in the video sequence.

Figure 1:
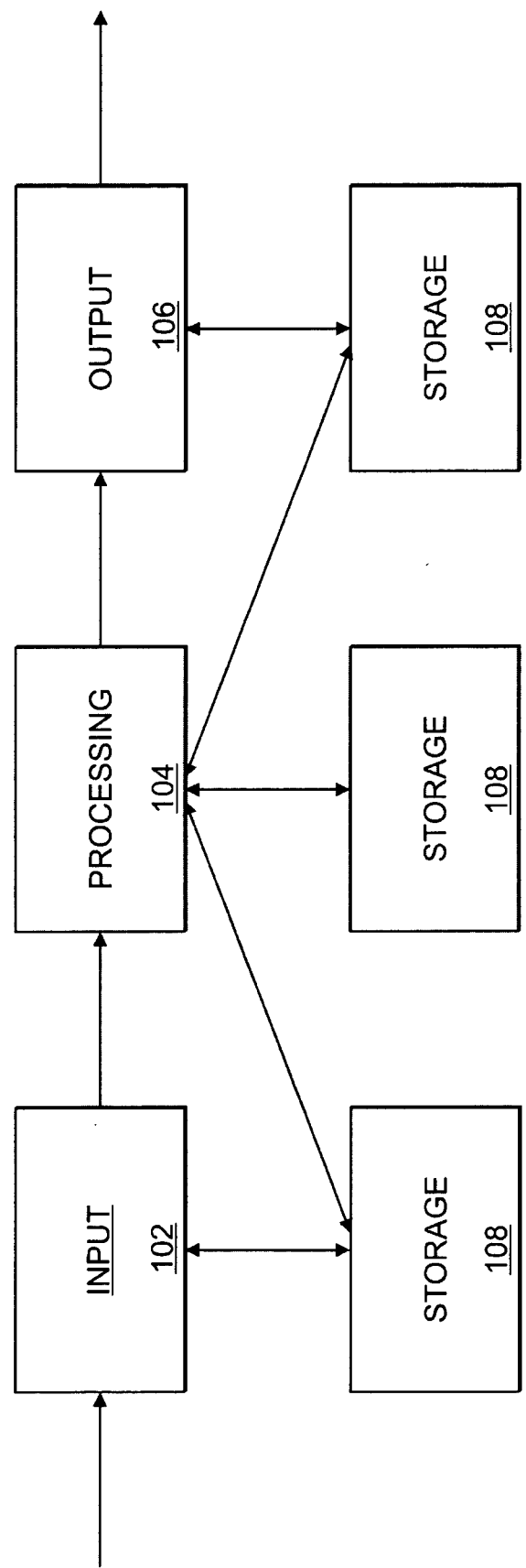
FIG. 1 is a block diagram illustrating a prior art video processing system.
Figure 2:
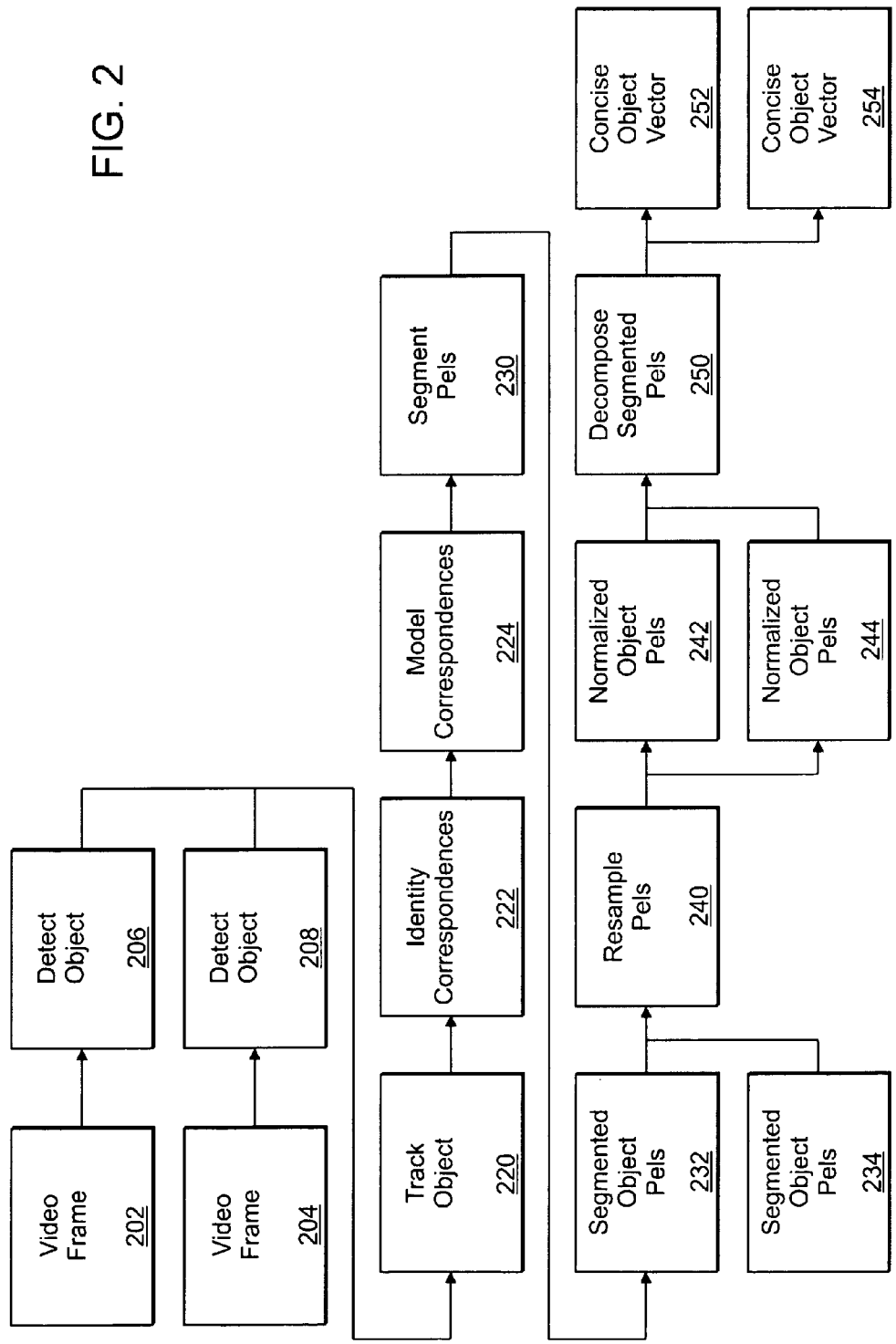
FIG. 2 is a block diagram of a system for processing video data according to the principles of the present invention.

The present invention as illustrated in FIG. 2 analyzes signal data and identifies the salient components. When the signal is comprised of video data, analysis of the spatiotemporal stream reveals salient components that are often specific objects, such as faces. The identification process qualifies the existence and significance of the salient components and chooses one or more of the most significant of those qualified salient components. This does not limit the identification and processing of other less salient components after or concurrently with the presently described processing. The aforementioned salient components are then further analyzed, identifying the variant and invariant subcomponents. The identification of invariant subcomponents is the process of modeling some aspect of the component, thereby revealing a parameterization of the model that allows the component to be synthesized to a desired level of accuracy.

In one embodiment of the invention, a foreground object is detected and tracked. The object's pels are identified and segmented from each frame of the video. The block-based motion estimation is applied to the segmented object in multiple frames. These motion estimates are then integrated into a higher order motion model. The motion model is employed to warp instances of the object to a common spatial configuration. For certain data in this configuration, more of the features of the object are aligned. This normalization allows the linear decomposition of the values of the object's pels over multiple frames to be compactly represented. The salient information pertaining to the appearance of the object is contained in this compact representation.

A preferred embodiment of the present invention details the linear decomposition of a foreground video object. The object is normalized spatially, thereby yielding a compact linear appearance model. A further preferred embodiment additionally segments the foreground object from the background of the video frame prior to spatial normalization.

A preferred embodiment of the invention applies the present invention to a video of a person speaking into a camera while undergoing a small amount of motion.

A preferred embodiment of the invention applies the present invention to any object in a video that can be represented well through spatial transformations.

A preferred embodiment of the invention specifically employs block-based motion estimation to determine finite differences between two or more frames of video. A higher order motion model is factored from the finite differences in order to provide a more effective linear decomposition.

Detection & Tracking (C1)

It is known in the art to detect an object in a frame and to track that object through a predetermined number of later frames. Among the algorithms and programs that can be used to perform the object detection function is the Viola/Jones: Viola, P. and M. Jones, "Robust Real-time Object Detection," *Proc. 2nd Int'l. Workshop on Statistical and Computational Theories of Vision—Modeling, Learning, Computing and Sampling*, Vancouver, Canada, July 2001. Likewise, there are a number of algorithms and programs that can be used to track the detected object through successive frames. An example includes Edwards, C. et al., "Learning to identify and track facts in an image sequence," *Proc. Int'l. Conf. Auto. Face and Gesture Recognition*, pp. 260-265, 1998.

The result of the object detection process is a data set that specifies the general position of the center of the object in the frame and an indication as to the scale (size) of the object. The result of the tracking process is a data set that represents a temporal label for the object and assures that to a certain level of probability the object detected in the successive frames is the same object.

The object detection and tracking algorithm may be applied to a single object in the frames or to two or more objects in the frames.

It is also known to track one or more features of the detected object in the group of sequential frames. If the object is a human face, for example, the features could be an eye or a nose. In one technique, a feature is represented by the intersection of "lines" that can loosely be described as a "corner". Preferably, "corners" that are both strong and spatially disparate from each other are selected as features. The features may be identified through a spatial intensity field gradient analysis. Employing a hierarchical multi-resolution estimation of the optical flow allows the determination of the translational displacement of the features in successive frames. Black, M. J. and Y. Yacoob, "Tracking and recognizing rigid and non-rigid facial motions using local parametric models of image motions," *Proceedings of the International Conference on Computer Vision*, pp. 374-381, Boston, June 1995, is an example of an algorithm that uses this technique to track features.

Once the constituent salient components of the signal have been determined, these components may be retained and all other signal components may be diminished or removed. The process of detecting the salient component is shown in FIG. 2 where the video frame 202 is processed by one or more Detect Object 206 processes, resulting in one or more objects being identified and subsequently tracked. The retained components represent the intermediate form of the video data. This intermediate data can then be encoded using techniques that are typically not available to existing video processing methods. As the intermediate data exists in several forms, standard video encoding techniques can also be used to encode several of these intermediate forms. For each instance, the present invention determines and then employs the encoding technique that is most efficient.

In one preferred embodiment, a saliency analysis process detects and classifies salient signal modes. One embodiment of this process employs a combination of spatial filters specifically designed to generate a response signal whose strength is relative to the detected saliency of an object in the video frame. The classifier is applied at differing spatial scales and in different positions of the video frame. The strength of the response from the classifier indicates the likelihood of the presence of a salient signal mode. When centered over a strongly salient object, the process classifies it with a correspondingly strong response. The detection of the salient signal mode distinguishes the present invention by enabling the subsequent processing and analysis on the salient information in the video sequence.

Feature Point Tracking (C7)

Given the detection location of a salient signal mode in one or more frames of video, the present invention analyzes the salient signal mode's invariant features. Additionally, the invention analyzes the residual of the signal, the "less-salient" signal modes, for invariant features. Identification of invariant features provides a basis for reducing redundant information and segmenting (i.e., separating) signal modes.

In one embodiment of the present invention, spatial positions in one or more frames are determined through spatial intensity field gradient analysis. These features correspond to some intersection of "lines" which can be described loosely as a "corner". Such an embodiment further selects a set of such corners that are both strong corners and spatially disparate from each other, herein referred to as the feature points. Further, employing a hierarchical multi-resolution estimation of the optical flow allows the determination of the translational displacement of the feature points over time.

In FIG. 2 the Track Object 220 process is shown to pull together the detection instances from the Detect Object processes 208 and further Identify Correspondences 222 of features of one or more of the detected objects over a multitude of Video Frames 202 and 204.

A non-limiting embodiment of feature tracking can be employed such that the features are used to qualify a more regular gradient analysis method such as block-based motion estimation.

Another embodiment anticipates the prediction of motion estimates based on feature tracking.

Object-Based Detection and Tracking (C1)

In one non-limiting embodiment of the current invention, a robust object classifier is employed to track faces in frames of video. Such a classifier is based on a cascaded response to oriented edges that has been trained on faces. In this classifier, the edges are defined as a set of basic Haar features and the rotation of those features by 45 degrees. The cascaded classifier is a variant of the AdaBoost algorithm. Additionally, response calculations can be optimized through the use of summed area tables.

Local Registration

Registration involves the assignment of correspondences between elements of identified objects in two or more video frames. These correspondences become the basis for modeling the spatial relationships between video data at temporally distinct points in the video data.

Various non-limiting means of registration are described for the present invention in order to illustrate specific embodiments and their associated reductions to practice in terms of well known algorithms and inventive derivatives of those algorithms.

One means of modeling the apparent optical flow in a spatio-temporal sequence can be achieved through generation of a finite difference field from two or more frames of the video data. Optical flow field can be sparsely estimated if the correspondences conform to certain constancy constraints in both a spatial and an intensity sense.

Figure 3:
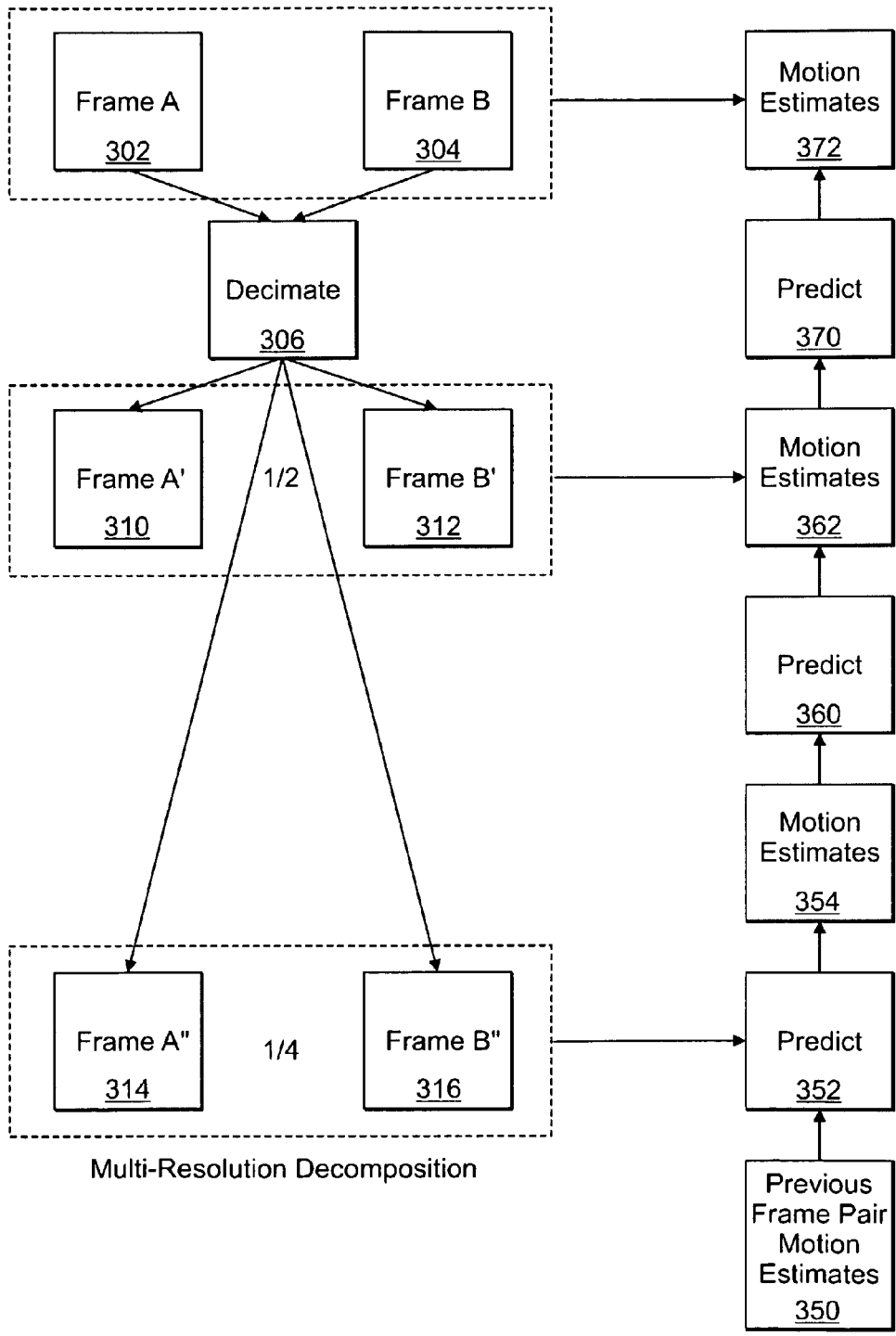
FIG. 3 is a block diagram illustrating the motion estimation method of the invention.

As shown in FIG. 3, a Frame (302 or 304) is sub-sampled spatially, possibly through a decimation process (306), or some other sub-sampling process (e.g. low pass filter). These spatially reduced images (310 & 312) can be further sub-sampled as well.

Other motion estimation techniques are suitable such as various block based motion estimation, mesh based and phase based ones as in related U.S. application Ser. No. 11/396,010.

Global Registration

In one embodiment, the present invention generates a correspondence model by using the relationships between corresponding elements of a detected object in two or more frames of video. These relationships are analyzed by factoring one or more linear models from a field of finite difference estimations. The term field refers to each finite difference having a spatial position. These finite differences may be the translational displacements of corresponding object features in disparate frames of video described in the Detection & Tracking section. The field from which such sampling occurs is referred to herein as the general population of finite differences. The described method employs robust estimation similar to that of the RANSAC algorithm as described in: M. A. Fischler, R. C. Bolles. "Random Sample Consensus: A Paradigm for Model Fitting with Applications to Image Analysis and Automated Cartography." Comm. of the ACM, Vol 24, pp 381-395, 1981.

Figure 4:
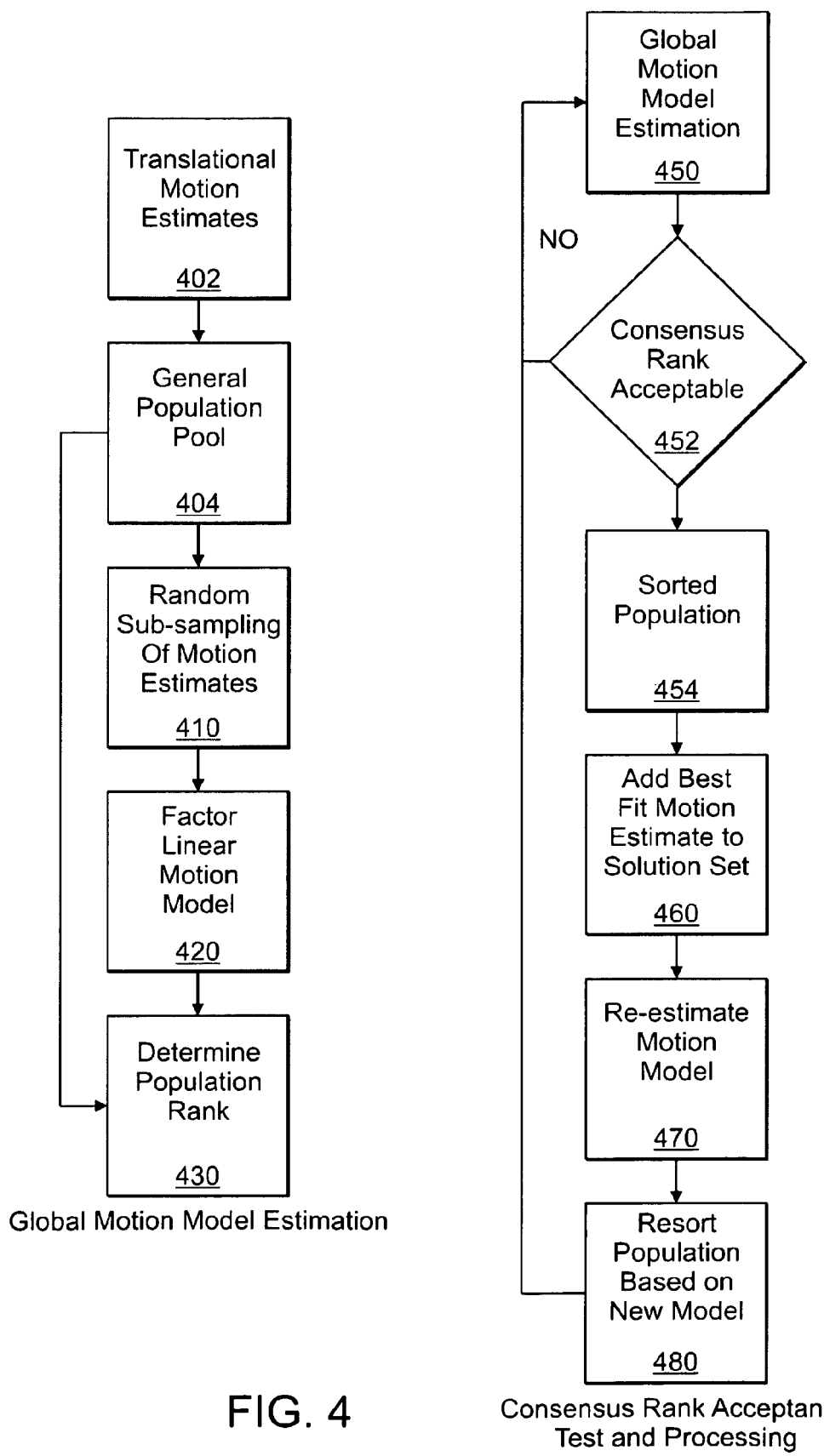
FIG. 4 is a block diagram illustrating the global registration method of the invention.

As shown in FIG. 4, the finite differences, in the case of global motion modeling, are Translational Motion Estimates (402) that are collected into a General Population Pool (404) which is iteratively processed by a Random Sampling of those Motion Estimates (410) and a linear model is factored out (420) of those samples. The Results are then used to adjust the population (404) to better clarify the linear model through the exclusion of outliers to the model, as found through the random process.

The present invention is able to utilize one or more robust estimators; one of which may be the RANSAC robust estimation process. Robust estimators are well documented in the prior art.

In one embodiment of the linear model estimation algorithm, the motion model estimator is based on a linear least squares solution. This dependency causes the estimator to be thrown off by outlier data. Based on RANSAC, the disclosed method is a robust method of countering the effect of outliers through the iterative estimation of subsets of the data, probing for a motion model that will describe a significant subset of the data. The model generated by each probe is tested for the percentage of the data that it represents. If there are a sufficient number of iterations, then a model will be found that fits the largest subset of the data. A description of how to perform such robust linear least squares regression is described in: R. Dutter and P. J. Huber. "Numerical methods for the nonlinear robust regression problem." Journal of Statistical and Computational Simulation, 13:79-113, 1981.

As conceived and illustrated in FIG. 4, the present invention discloses innovations beyond the RANSAC algorithm in the form of alterations of the algorithm that involve the initial sampling of finite differences (samples) and least squares estimation of a linear model. Synthesis error is assessed for all samples in the general population using the solved linear model. A rank is assigned to the linear model based on the number of samples whose residual conforms to a preset threshold. This rank is considered the "candidate consensus".

The initial sampling, solving, and ranking are performed iteratively until termination criteria are satisfied. Once the criteria are satisfied, the linear model with the greatest rank is considered to be the final consensus of the population.

An option refinement step involves iteratively analyzing subsets of samples in the order of best fit to the candidate model, and increasing the subset size until adding one more sample would exceed a residual error threshold for the whole subset.

As shown in FIG. 4, The Global Model Estimation process (450) is iterated until the Consensus Rank Acceptability test is satisfied (452). When the rank has not been achieved, the population of finite differences (404) is sorted relative to the discovered model in an effort to reveal the linear model. The best (highest rank) motion model is added to a solution set in process 460. Then the model is re-estimated in process 470. Upon completion, the population (404) is re-sorted.

The described non-limiting embodiments of the invention can be further generalized as a general method of sampling a vector space, described above as a field of finite difference vectors, in order to determine subspace manifolds in another parameter vector space that would correspond to a particular linear model.

A further result of the global registration process is that the difference between this and the local registration process yields a local registration residual. This residual is the error of the global model in approximating the local model.

Normalization (C1)

Figure 5:
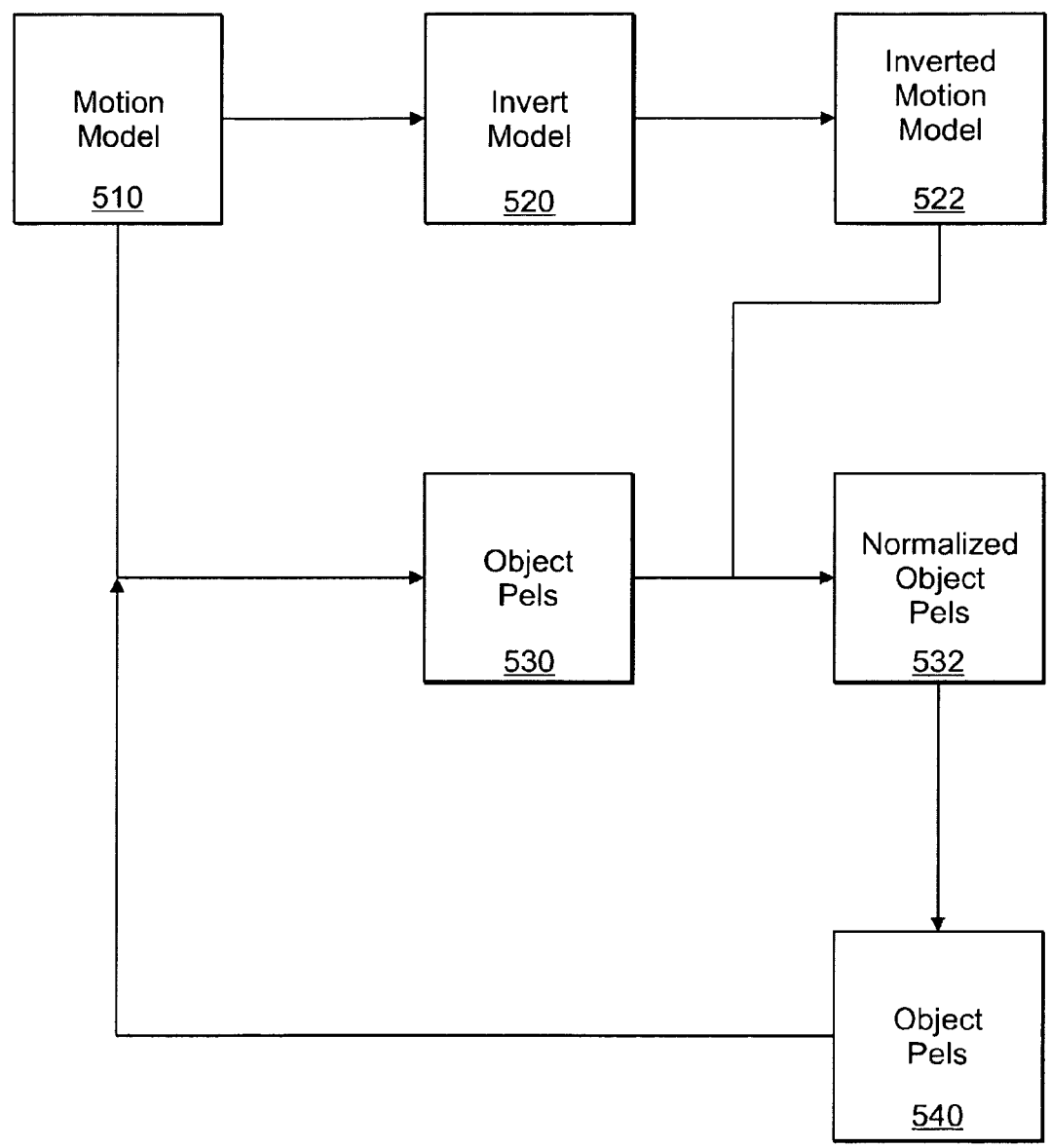
FIG. 5 is a block diagram illustrating the normalization method of the invention.

Normalization refers to the resampling of spatial intensity fields towards a standard, or common, spatial configuration. When these relative spatial configurations are invertible spatial transformations between such configurations, the resampling and accompanying interpolation of pels are also invertible up to a topological limit. The normalization method of the present invention is illustrated in FIG. 5.

When more than two spatial intensity fields are normalized, increased computational efficiency may be achieved by preserving intermediate normalization calculations.

Spatial transformation models used to resample images for the purpose of registration, or equivalently for normalization, include global and local models. Global models are of increasing order from translational to projective. Local models are finite differences that imply an interpolant on a neighborhood of pels as determined basically by a block or more complexly by a piece-wise linear mesh.

Interpolation of original intensity fields to normalized intensity field increases linearity of PCA appearance models based on subsets of the intensity field.

As shown in FIG. 2, the object pels 232 and 234 can be re-sampled 240 to yield a normalized version of the object pels 242 and 244.

Mesh-Based Normalization

A further embodiment of the present invention tessellates the feature points into a triangle based mesh, the vertices of the mesh are tracked, and the relative positions of each triangle's vertices are used to estimate the three-dimensional surface normal for the plane coincident with those three vertices. When the surface normal is coincident with the projective axis of the camera, the imaged pels can provide a least-distorted rendering of the object corresponding to the triangle. Creating a normalized image that tends to favor the orthogonal surface normal can produce a pel preserving intermediate data type that will increase the linearity of subsequent appearance-based PCA models.

Another embodiment utilizes conventional block-based motion estimation to implicitly model a global motion model. In one, non-limiting embodiment, the method factors a global affine motion model from the motion vectors described by the conventional block-based motion estimation/prediction.

Figure 9:
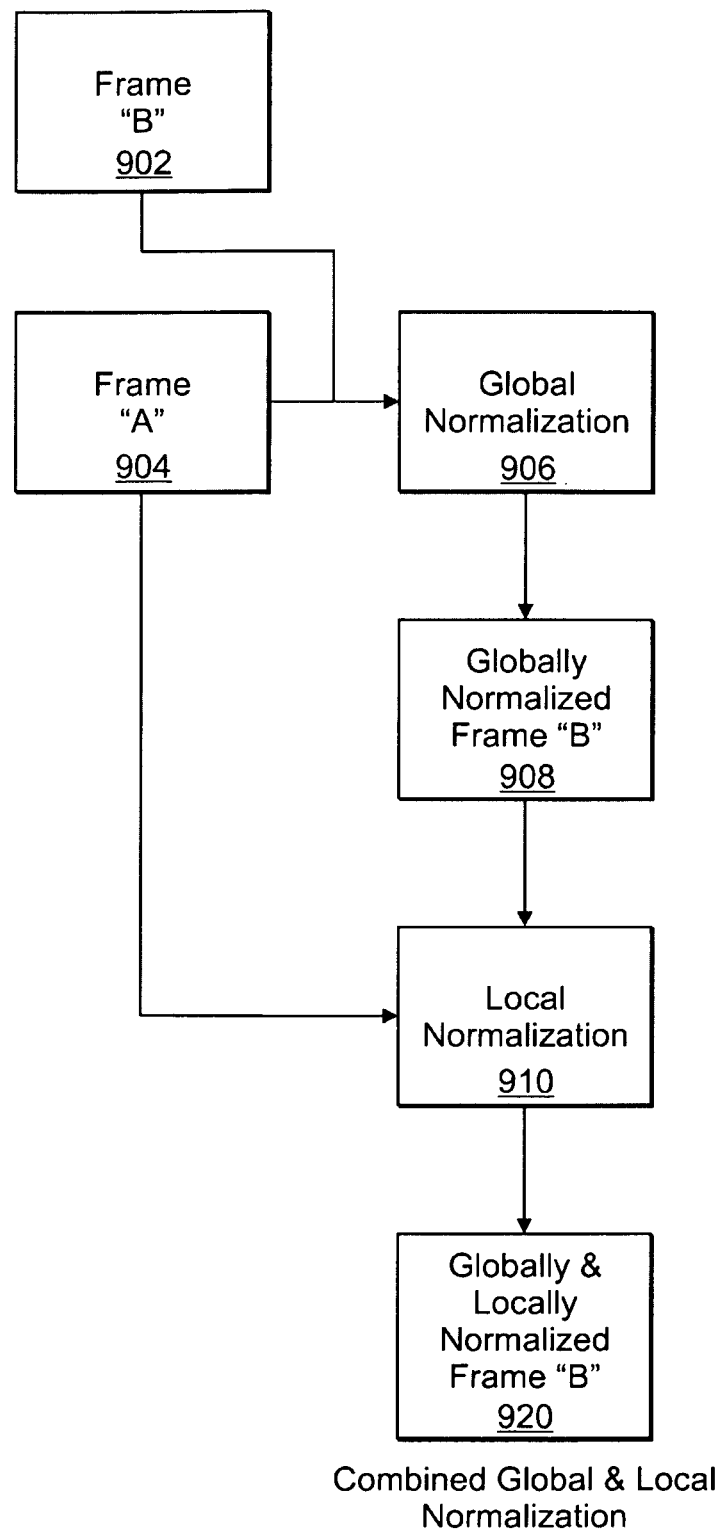
FIG. 9 is a block diagram illustrating the combined global and local normalization method of the invention.

The present inventive method utilizes one or more global motion estimation techniques including the linear solution to a set of affine projective equations. Other projective models and solution methods are described in the prior art. FIG. 9 illustrates the method of combining global and local normalization.

Local Normalization

The present invention provides a means by which pels in the spatiotemporal stream can be registered in a 'local' manner.

One such localized method employs the spatial application of a geometric mesh to provide a means of analyzing the pels such that localized coherency in the imaged phenomena are accounted for when resolving the apparent image brightness constancy ambiguities in relation to the local deformation of the imaged phenomena, or specifically an imaged object.

Such a mesh is employed to provide a piece-wise linear model of surface deformation in the image plane as a means of local normalization. The imaged phenomena may often correspond to such a model when the temporal resolution of the video stream is high compared with the motion in the video. Exceptions to the model assumptions are handled through a variety of techniques, including: topological constraints, neighbor vertex restrictions, and analysis of homogeneity of pel and image gradient regions.

Figure 7:
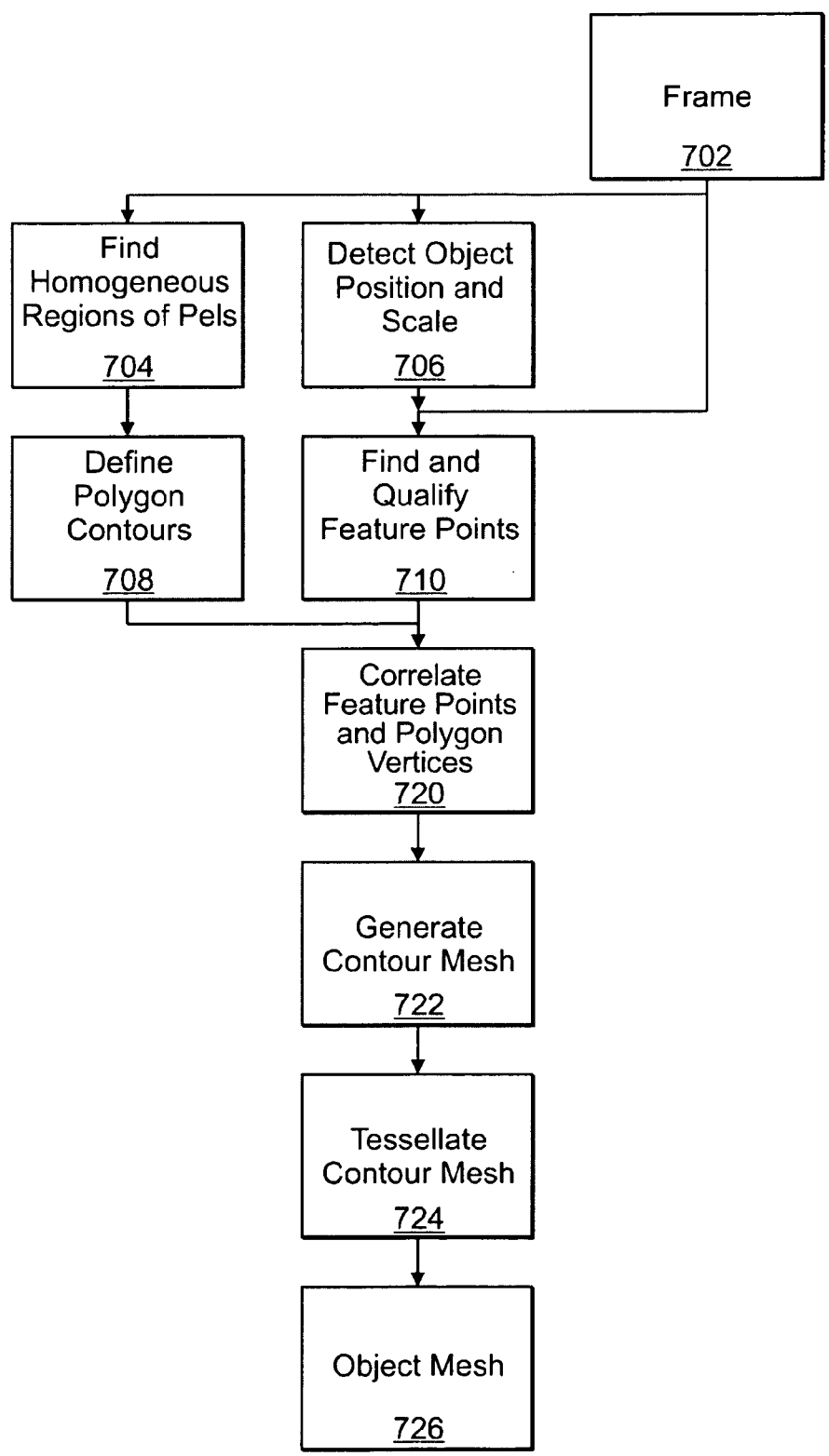
FIG. 7 is a block diagram illustrating the mesh generation method of the invention employed in local normalization.
Figure 8:
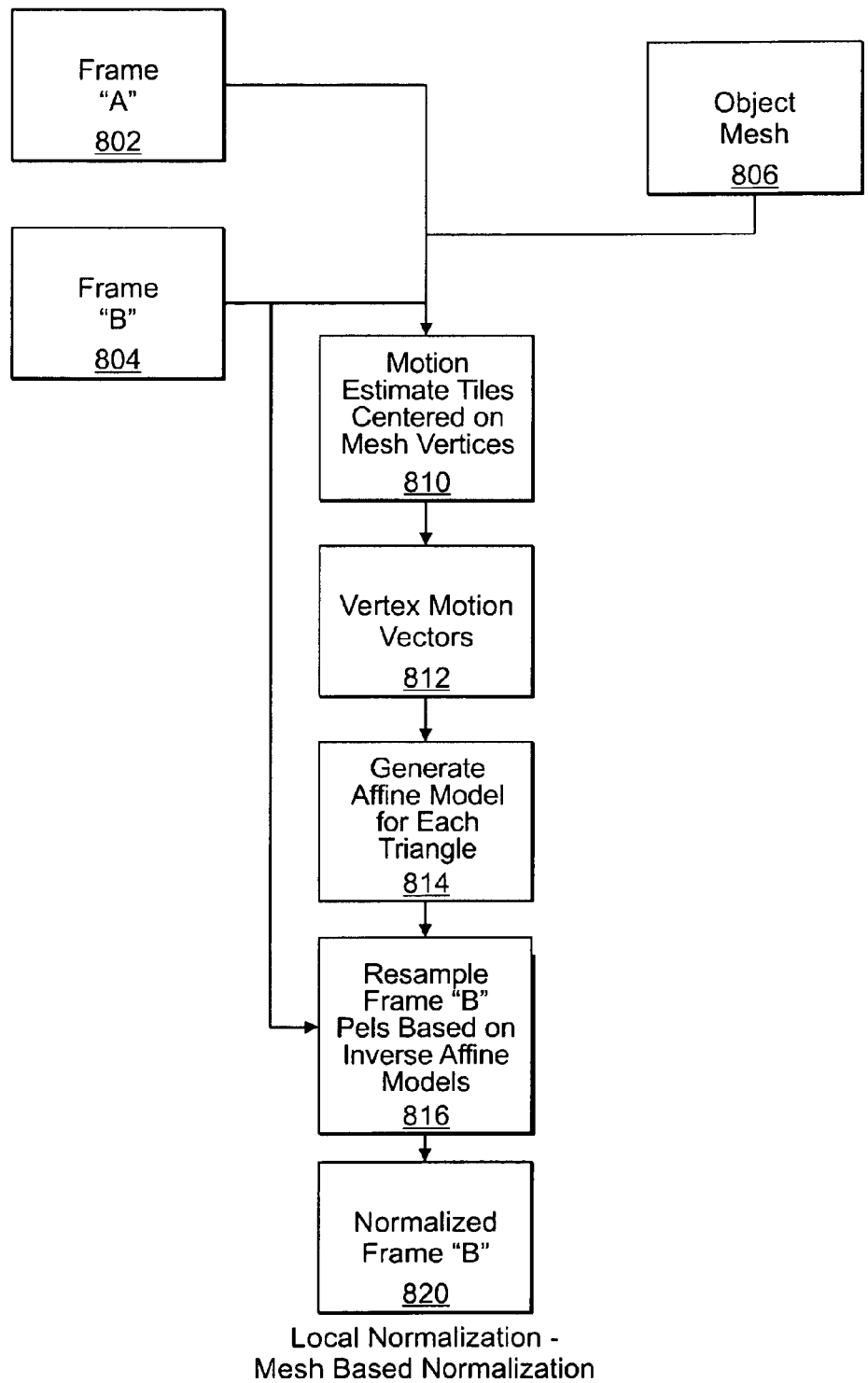
FIG. 8 is a block diagram illustrating the mesh based normalization method of the invention employed in local normalization.

In one embodiment, feature points are used to generate a mesh constituted of triangular elements whose vertices correspond to the feature points. The corresponding feature points in other frames imply an interpolated "warping" of the triangles, and correspondingly the pels, to generate a local deformation model. FIG. 7 illustrates the generation of such an object mesh. FIG. 8 illustrates the use of such an object mesh to locally normalize frames.

In one embodiment, a triangle map is generated which identifies the triangle that each pel of the map comes from. Further, the affine transform corresponding to each triangle is pre-computed as an optimization step. And further, when creating the local deformation model, the anchor image (previous) is traversed using the spatial coordinates to determine the coordinates of the source pel to sample. This sampled pel will replace the current pel location.

In another embodiment, local deformation is preformed after global deformation. In a previously disclosed specification above, Global Normalization was described as the process by which a Global Registration method is used to spatially normalize pels in two or more frames of video. The resulting globally normalized video frames can further be locally normalized. The combination of these two methods constrains the local normalization to a refinement of the globally arrived at solution. This can greatly reduce the ambiguity that the local method is required to resolve.

In another non-limiting embodiment, feature points, or in the case of a "regular mesh"—vertex points, are qualified through analysis of the image gradient in the neighborhood of those points. This image gradient can be calculated directly, or through some indirect calculation such as a Harris response. Additionally, these points can be filtered by a spatial constraint and motion estimation error associated with a descent of the image gradient. The qualified points can be used as the basis for a mesh by one of many tessellation techniques, resulting in a mesh whose elements are triangles. For each triangle, an affine model is generated based on the points and their residual motion vector.

The present inventive method utilizes one or more image intensity gradient analysis methods, including the Harris response. Other image intensity gradient analysis methods are described in the prior art.

In an embodiment, a list of the triangles affine parameters is maintained. The list is iterated and a current/previous point list is constructed (using the a vertex look up map). The current/previous point list is passed to a routine that is used to estimate the transform, which computes the affine parameters for that triangle. The affine parameters, or model, are then saved in the triangle affine parameter list.

In a further embodiment, the method traverses a triangle identifier image map, where each pel in the map contains the identifier for the triangle in the mesh for which the pel has membership. And for each pel that belongs to a triangle, the corresponding global deformation coordinates, and local deformation coordinates for that pel are calculated. Those coordinates, in turn, are used to sample the corresponding pel and to apply its value in the corresponding "normalize" position.

In a further embodiment, spatial constraints are applied to the points based on density and the image intensity correspondence strength resulting from the search of the image gradient. The points are sorted after motion estimation is done based on some norm of the image intensity residual. Then the points are filtered based on a spatial density constraint.

In a further embodiment, spectral spatial segmentation is employed, and small homogeneous spectral regions are merged based on spatial affinity, similarity of their intensity and/or color, with neighboring regions. Then homogenous merging is used to combine spectral regions together based on their overlap with a region of homogenous texture (image gradient). A further embodiment then uses center-surround points, those were a small region is surrounded by a larger region, as qualified interest points for the purpose of supporting a vertex point of the mesh. In a further non-limiting embodiment, a center surround point is defined as a region whose bounding box is within one pel of being 3×3 or 5×5 or 7×7 pels in dimension, and the spatial image gradient for that bounding box is a corner shape. The center of the region can be classified as a corner, further qualifying that position as an advantageous vertex position.

In a further embodiment, the horizontal and vertical pel finite difference images are used to classify the strength of each mesh edge. If an edge has many finite differences coincident with its spatial position, then the edge, and hence the vertices of that edge are considered to be highly critical to the local deformation of the imaged phenomena. If there is a large derivative difference between the averages of the sums of the finite differences of the edge, then mostly likely the region edge corresponds to a texture change edge, and not a quantization step.

In a further embodiment, a spatial density model termination condition is employed to optimize the processing of the mesh vertices. When a sufficient number of points have been examined that covers most of the spatial area of an outset of the detection rectangle, then the processing can be terminated. The termination generates a score. Vertex and feature points entering the processing are sorted by this score. If the point is too spatially close to an existing point, or if the point does not correspond to an edge in the image gradient, then it is discarded. Otherwise, the image gradient in the neighborhood of the point is descended, and if the residual of the gradient exceeds a limit, then that point is also discarded.

In a preferred embodiment, the local deformation modeling is performed iteratively, converging on a solution as the vertex displacements per iteration diminish.

In another embodiment, local deformation modeling is performed, and the model parameters are discarded if the global deformation has already provided the same normalization benefit.

Other normalization techniques alone or in combination (such as described in related U.S. application Ser. No. 11/396,010) are suitable.

Segmentation

The spatial discontinuities identified through the further described segmentation processes are encoded efficiently through geometric parameterization of their respective boundaries, referred to as spatial discontinuity models. These spatial discontinuity models may be encoded in a progressive manner allowing for ever more concise boundary descriptions corresponding to subsets of the encoding. Progressive encoding provides a robust means of prioritizing the spatial geometry while retaining much of the salient aspects of the spatial discontinuities.

A preferred embodiment of the present invention combines a multi-resolution segmentation analysis with the gradient analysis of the spatial intensity field and further employs a temporal stability constraint in order to achieve a robust segmentation.

As shown in FIG. 2, once the correspondences of feature of an object have been tracked over time 220 and modeled 224, adherence to this motion/deformation model can be used to segment the pels corresponding to the object 230. This process can be repeated for a multiple of detected objects 206 and 208 in the video 202 and 204. The results of this processing are the segmented object pels 232.

One form of invariant feature analysis employed by the present invention is focused on the identification of spatial discontinuities. These discontinuities manifest as edges, shadows, occlusions, lines, corners or any other visible characteristic that causes an abrupt and identifiable separation between pels in one or more imaged frames of video. Additionally, subtle spatial discontinuities between similarly colored and/or textured objects may only manifest when the pels of the objects in the video frame are undergoing coherent motion relative to the objects themselves, but different motion relative to each other. The present invention utilizes a combination of spectral, texture and motion segmentation to robustly identify the spatial discontinuities associated with a salient signal mode.

Temporal Segmentation

The temporal integration of translational motion vectors, or equivalently finite difference measurements in the spatial intensity field, into a higher order motion model is a form of motion segmentation that is described in the prior art.

In one embodiment of the invention, a dense field of motion vectors is produced representing the finite differences of object motion in the video. These derivatives are grouped together spatially through a regular partitioning of tiles or by some initialization procedure such as spatial segmentation. The "derivatives" of each group are integrated into a higher order motion model using a linear least squares estimator. The resulting motion models are then clustered as vectors in the motion model space using the k-means clustering technique. The derivatives are classified based on which cluster best fits them. The cluster labels are then spatially clustered as an evolution of the spatial partitioning. The process is continued until the spatial partitioning is stable.

In a further embodiment of the invention, motion vectors for a given aperture are interpolated to a set of pel positions corresponding to the aperture. When the block defined by this interpolation spans pels corresponding to an object boundary, the resulting classification is some anomalous diagonal partitioning of the block.

In the prior art, the least squares estimator used to integrate the derivatives is highly sensitive to outliers. The sensitivity can generate motion models that heavily bias the motion model clustering method to the point that the iterations diverge widely.

In the present invention the motion segmentation methods identify spatial discontinuities through analysis of apparent pel motion over two or more frames of video. The apparent motion is analyzed for consistency over the frames of video and integrated into parametric motion models. Spatial discontinuities associated with such consistent motion are identified. Motion segmentation can also be referred to as temporal segmentation, because temporal changes may be caused by motion. However, temporal changes may also be caused by some other phenomena such as local deformation, illumination changes, etc.

Through the described method, the salient signal mode that corresponds to the normalization method can be identified and separated from the ambient signal mode (background or non-object) through one of several background subtraction methods. Often, these methods statistically model the background as the pels that exhibit the least amount of change at each time instance. Change can be characterized as a pel value difference.

Segmentation perimeter-based global deformation modeling is achieved by creating a perimeter around the object then collapsing the perimeter toward the detected center of the object until perimeter vertices have achieved a position coincident with a heterogeneous image gradient. Motion estimates are gathered for these new vertex positions and robust affine estimation is used to find the global deformation model.

Segmented mesh vertex image gradients (in particular, descent-based finite differences) are integrated into a global deformation model.

Object Segmentation

Figure 13:
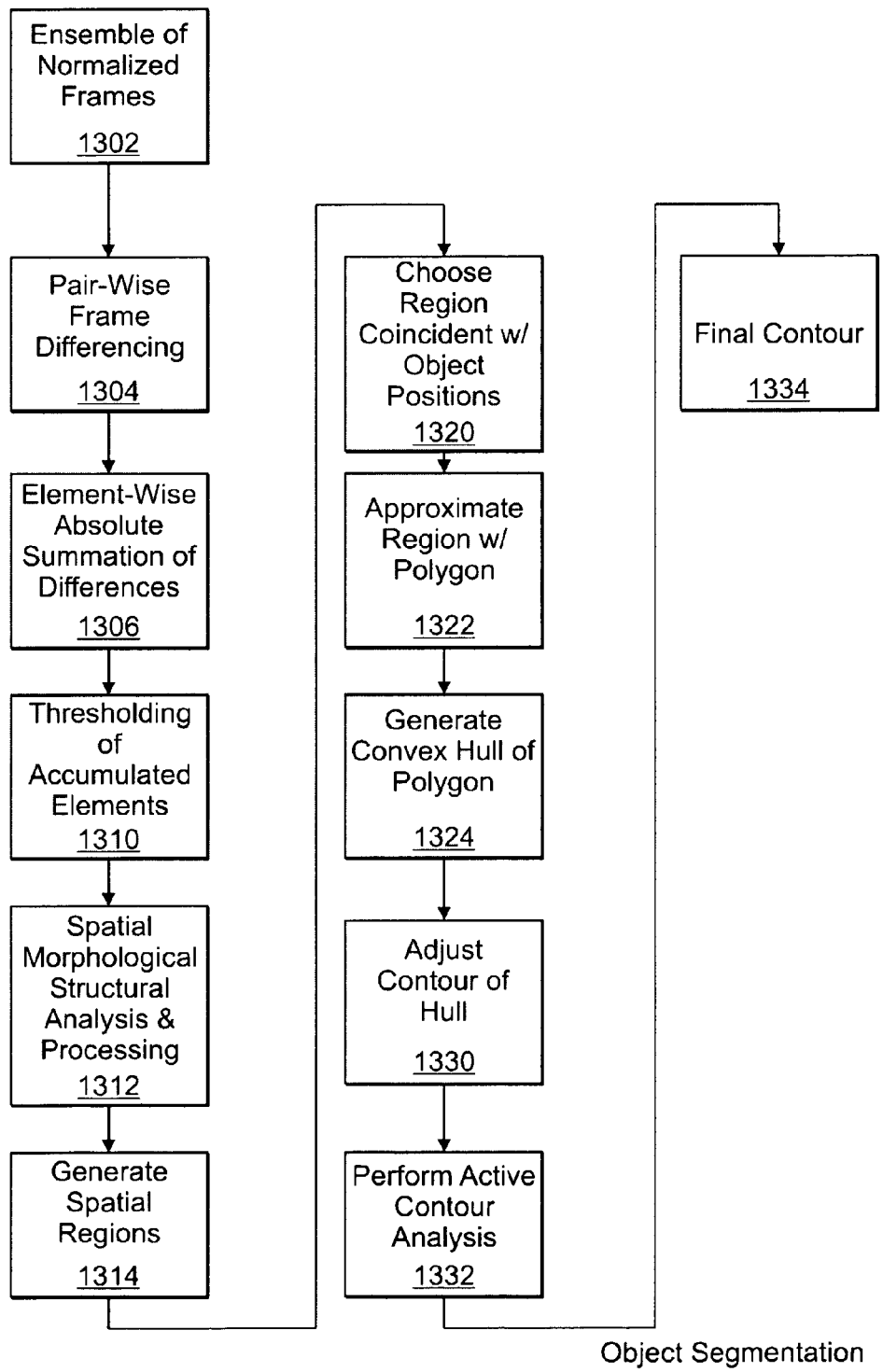
FIG. 13 is a block diagram illustrating the object segmentation method of the invention.

The block diagram shown in FIG. 13 shows one embodiment of object segmentation. The process shows begins with an ensemble of normalized images 1302 that are then pair-wise differenced 1304 among the ensemble. These differences are then element-wise accumulated 1306 into an accumulation buffer. The accumulation buffer is thresholded 1310 in order to identify the more significant error regions. The thresholded element mask is then morphologically analyzed 1312 in order to determine the spatial support of the accumulated error regions 1310. The resulting extraction 1314 of the morphological analysis 1312 is then compared with the detected object position 1320 in order to focus subsequent processing on accumulated error regions that are coincident with the object. The isolated spatial region's 1320 boundary is then approximated with a polygon 1322 of which a convex hull is generated 1324. The contour of the hull is then adjusted 1332 in order to better initialize the vertices' positions for active contour analysis 1332. Once the active contour analysis 1332 has converged on a low energy solution in the accumulated error space, the contour is used as the final contour 1334 and the pels constrained in the contour are considered those that are most likely object pels, and those pels outside of the contour are considered to be non-object pels.

In a one embodiment, motion segmentation can be achieved given the detected position and scale of the salient image mode. A distance transform can be used to determine the distance of every pel from the detected position. If the pel values associated with the maximum distance are retained, a reasonable model of the background can be resolved. In other words, the ambient signal is re-sampled temporally using a signal difference metric.

A further embodiment includes employing a distance transform relative to the current detection position to assign a distance to each pel. If the distance to a pel is greater than the distance in some maximum pel distance table, then the pel value is recorded. After a suitable training period, the pel is assumed to have the highest probability of being a background pel if the maximum distance for that pel is large.

Given a model of the ambient signal, the complete salient signal mode at each time instance can be differenced. Each of these differences can be re-sampled into spatially normalized signal differences (absolute differences). These differences are then aligned relative to each other and accumulated. Since these differences have been spatially normalized relative to the salient signal mode, peaks of difference will mostly correspond to pel positions that are associated with the salient signal mode.

In one embodiment of the invention, a training period is defined where object detection positions are determined and a centroid of these positions is used to determine optimal frame numbers with detection positions far from this position that would allow for framing differencing to yield background pels that would have the highest probability of being non-object pels.

In one embodiment of the present invention, active contour modeling is used to segment the foreground object from the non-object background by determining contour vertex positions in accumulated error "image". In a preferred embodiment the active contour edges are subdivided commensurate with the scale of the detected object to yield a greater degree of freedom. In a preferred embodiment, the final contour positions can be snapped to a nearest regular mesh vertex in order to yield a regularly spaced contour.

In one non-limited embodiment of object segmentation, an oriented kernel is employed for generating error image filter responses for temporally pair-wise images. Response to the filter that is oriented orthogonal to the gross motion direction tends to enhance the error surface when motion relative to the background occurs from occlusion and revealing of the background.

The normalized image frame intensity vectors of an ensemble of normalized images are differenced from one or more reference frame creating residual vectors. These residual vectors are accumulated element-wise to form an accumulated residual vector. This accumulated residual vector is then probed spatially in order to define a spatial object boundary for spatial segmentation of the object and non-object pels.

In one embodiment, an initial statistical analysis of the accumulated residual vector is performed to arrive at a statistical threshold value that can be used to threshold the accumulated residual vector. Through an erosion and subsequent dilation morphological operation, a preliminary object region mask is created. The contour polygon points of the region are then analyzed to reveal the convex hull of these points. The convex hull is then used as an initial contour for an active contour analysis method. The active contour is then propagated until it converges on the spatial boundaries of the object's accumulated residual. In a further preferred embodiment, the preliminary contour's edges are further subdivided by adding midpoint vertices until a minimal edge length is achieved for all the edge lengths. This further embodiment is meant to increase the degrees of freedom of the active contour model to more accurately fit the outline of the object.

In at least one embodiment, the refined contour is used to generate a pel mask indicating the pels of the object by overlaying the polygon implied by the contour and overlaying the polygon in the normalized images.

Resolution of Non-Object

Figure 12:
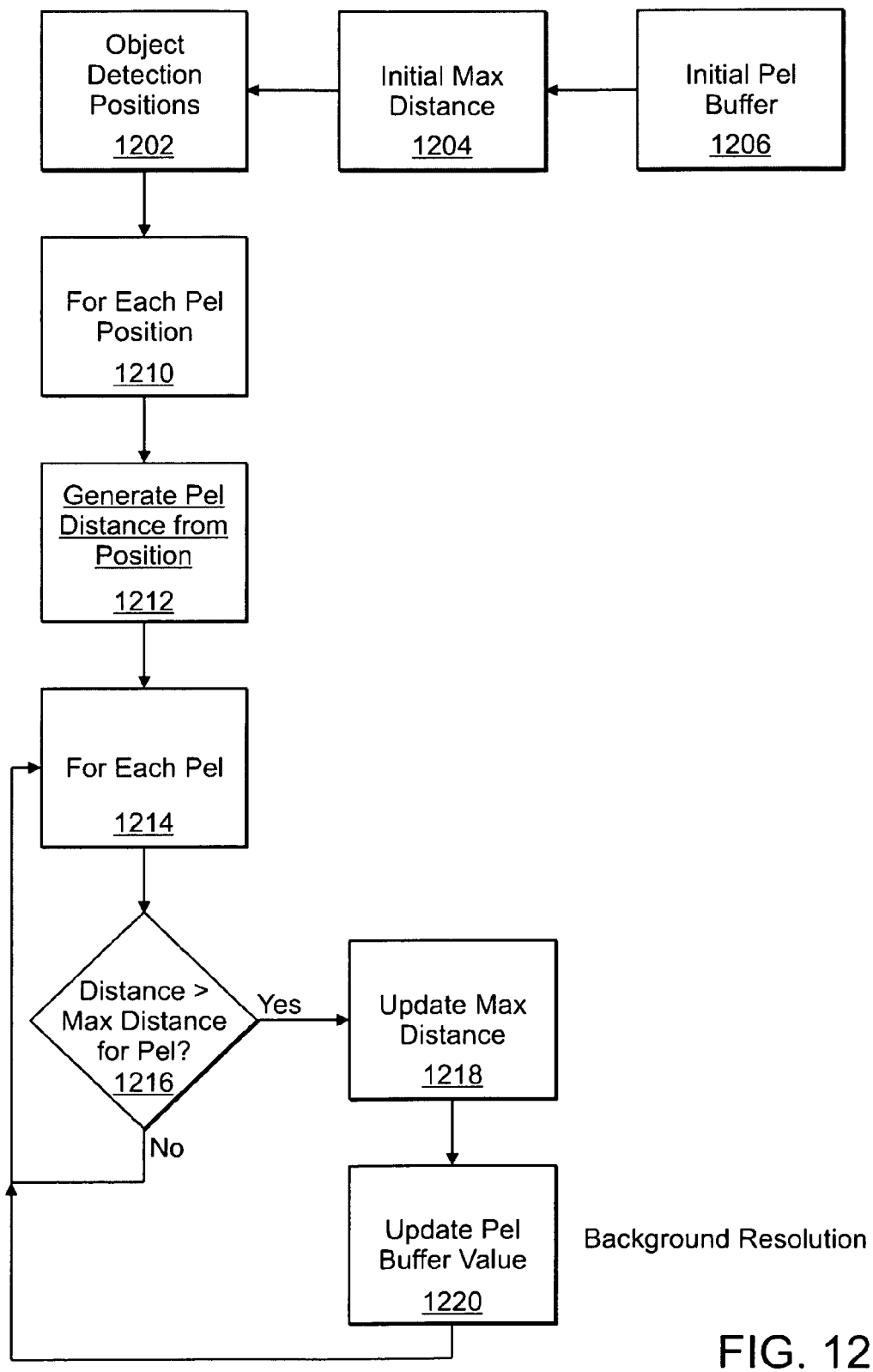
FIG. 12 is a block diagram illustrating the background resolution method.

The block diagram shown in FIG. 12 discloses one embodiment of non-object segmentation, or equivalently background resolution. With the initialization of a background buffer (1206) and an initial maximum distance value (1204) buffer, the process works to determine the most stable non-object pels by associating "stability" with the greatest distance from the detected object position (1202). Given a new detected object position (1202), the process checks each pel position (1210). For each pel position (1210), the distance from the detected object position (1210) is calculated using a distance transform. If the distance for that pel is greater (1216) than the previously stored position in the maximum distance buffer (1204) then the previous value is replace with the current value (1218) and the pel value is recorded (1220) in the pel buffer.

Given a resolved background image, the error between this image and the current frame can be normalized spatially and accumulated temporally. Such a resolved background image is described in the "background resolution" section. The resolution of the background through this method is considered a time-based occlusion filter process.

The resulting accumulated error is then thresholded to provide an initial contour. The contour is then propagated spatially to balance error residual against contour deformation.

In an alternative embodiment, absolute differences between the current frame and the resolved background frames is computed. The element-wise absolute difference is then segmented into distinct spatial regions. These regions bounding boxes average pel value is computed, so that when the resolved background is updated, the difference between the current and resolved background average pel value can be used to perform a contrast shift, so that the current region can blend in more effectively with the resolved background. In another embodiment, the vertices within the normalized frame mask are motion estimated and saved for each frame. These are then processed using SVD to generate a local deformation prediction for each of the frames.

Other segmentation methods and mechanisms, e.g., textual, spectral and background, are employed in preferred embodiments as described in related U.S. application Ser. No. 11/396,010.

Appearance Variance Modeling

A common goal of video processing is often to model and preserve the appearance of a sequence of video frames. The present invention is aimed at allowing constrained appearance modeling techniques to be applied in robust and widely applicable ways through the use of preprocessing. The registration, segmentation and normalization described previously are expressly for that purpose.

The present invention discloses a means of appearance variance modeling. The primary basis of the appearance variance modeling is, in the case of a linear model, the analysis of feature vectors to reveal compact basis exploiting linear correlations. Feature vectors representing spatial intensity field pels can be assembled into an appearance variance model.

In an alternative embodiment, the appearance variance model is calculated from a segmented subset of the pels. Further, the feature vector can be separated into spatially non-overlapping feature vectors. Such spatial decomposition may be achieved with a spatial tiling. Computational efficiency may be achieved through processing these temporal ensembles without sacrificing the dimensionality reduction of the more global PCA method.

When generating an appearance variance model, spatial intensity field normalization can be employed to decrease PCA modeling of spatial transformations.

Deformation Modeling

Local deformation can be modeled as vertex displacements and an interpolation function can be used to determine the resampling of pels according to vertices that are associated with those pels. These vertex displacements may provide a large amount of variation in motion when looked at as a single parameter set across many vertices. Correlations in these parameters can greatly reduce the dimensionality of this parameter space.

PCA

The preferred means of generating an appearance variance model is through the assembly of frames of video as pattern vectors into a training matrix, or ensemble, and application of Principal Component Analysis (PCA) on the training matrix. When such an expansion is truncated, the resulting PCA transformation matrix is employed to analyze and synthesize subsequent frames of video. Based on the level of truncation, varying levels of quality of the original appearance of the pels can be achieved.

The specific means of construction and decomposition of the pattern vectors is well known to one skilled in the art.

Given the spatial segmentation of the salient signal mode from the ambient signal and the spatial normalization of this mode, the pels themselves, or equivalently, the appearance of the resulting normalized signal, can be factored into linearly correlated components with a low rank parameterization allowing for a direct trade off between approximation error and bit rate for the representation of the pel appearance. One method for achieving a low rank approximation is through the truncation of bytes and/or bits of encoded data. A low rank approximation is considered a compression of the original data as determined by the specific application of this technique. For example, in video compression, if the truncation of data does not unduly degrade the perceptual quality, then the application specific goal is achieved along with compression.

As shown in FIG. 2, the normalized object pels 242 and 244 can be projected into a vector space and the linear correspondences can be modeled using a decomposition process 250 such as PCA in order to yield a dimensionally concise version of the data 252 and 254.

PCA and Precision Analysis

The present invention employs a statistical analysis to determine an approximation of the normalized pel data. This approximation is the "encoded" form of the normalized pel data. The statistical analysis is achieved through a linear decomposition of the normalized pel data, specifically implemented as a Singular Value Decomposition (SVD) which can be generally referred to as Principal Component Analysis (PCA) in this case. The result of this operation is a set of one or more basis vectors. These basis vectors can be used to progressively describe ever more accurate approximations of the normalized pel data. As such, the truncation of one or more of the least significant basis vectors is performed to produce an encoding that is sufficient to represent the normalized pel data to a required quality level.

In general, PCA cannot be effectively applied to the original video frames. But, once the frames have been segmented and further normalized, the variation in the appearance of the pels in those frames no longer has the interference of background pels or the spatial displacements from global motion. Without these two forms of variation, PCA is able to more accurately approximate the appearance of this normalized pel data using fewer basis vectors than it would otherwise. The resulting benefit is a very compact representation, in terms of bandwidth, of the original appearance of the object in the video.

The truncation of basis vectors can be performed in several ways, and each truncation is considered to be a form of precision analysis when combined with PCA. This truncation can simply be the described exclusion of entire basis vectors from the set of basis vectors. Alternatively, the vector element and/or element bytes and/or bits of those bytes can be selectively excluded (truncated). Further, the basis vectors themselves can be transformed into alternate forms that would allow even more choices of truncation methods. Wavelet transform using an Embedded Zero Tree truncation is one such form.

Method

Normalized pel data from 242 and 244 in FIG. 2 are reorganized into pattern vectors that are assembled into an ensemble of vectors that is decomposed into a set of basis vectors using PCA, or more specifically, SVD.

Least significant basis vectors are then removed (truncated) from the set of basis vectors to achieve a quality requirement.

Individual normalized pel data associated with each frame produces an encoded pattern vector when projected onto the truncated basis vectors. This encoded pattern vector is the encoded form of the normalized pel data, referred to as the encoded pel data. Note that the normalized pel data also needs to be reorganized into a "pattern vector" prior to being projected on the basis.

The encoded pel data can be decoded by projecting it onto the inversion of the basis vectors. This inverse projection yields an approximation (synthesis) of the original normalized pel data 242, 245.

Uses

Generating normalized pel data and further reducing it to the encoded pel data provides a data representation of the appearance of the pel data in the original video frame. This representation can be useful in and of itself, or as input for other processing. The encoded data may be compact enough to provide an advantageous compression ratio over conventional compression without further processing.

The encoded data may be used in place of the "transform coefficients" in conventional video compression algorithms. In a conventional video compression algorithm, the pel data is "transform encoded" using a Discrete Cosine Transform (DCT). The resulting "transform coefficients" are then further processed using quantization and entropy encoding. Quantization is a way to lower the precision of the individual coefficients. Entropy encoding is a lossless compression of the quantized coefficients and can be thought of in the same sense as zipping a file. The present invention is generally expected to yield a more compact encoded vector than DCT, thereby allowing a higher compression ratio when used in a conventional codec algorithm.

In one embodiment, the invention system alternates between encoding video frames as described in U.S. patent application Ser. No. 11/191,562 and the above-described approximation encoding. The system alternates as a function of least used bandwidth.

Sequential PCA

PCA encodes patterns into PCA coefficients using a PCA transform. The better the patterns are represented by the PCA transform, the fewer coefficients are needed to encode the pattern. Recognizing that pattern vectors may degrade as time passes between acquisition of the training patterns and the patterns to be encoded, updating the transform can help to counteract the degradation. As an alternative to generating a new transform, sequential updating of existing patterns is more computationally efficient in certain cases.

Many state of the art video compression algorithms predict a frame of video from one or more other frames. The prediction model is commonly based on a partitioning of each predicted frame into non-overlapping tiles which are matched to a corresponding patch in another frame and an associated translational displacement parameterized by an offset motion vector. This spatial displacement, optionally coupled with a frame index, provides the "motion predicted" version of the tile. If the error of the prediction is below a certain threshold, the tile's pels are suitable for residual encoding; and there is a corresponding gain in compression efficiency. Otherwise, the tile's pels are encoded directly. This type of tile-based, alternatively termed block-based, motion prediction method models the video by translating tiles containing pels. When the imaged phenomena in the video adheres to this type of modeling, the corresponding encoding efficient increases. This modeling constraint assumes a certain level of temporal resolution, or number of frames per second, is present for imaged objects undergoing motion in order to conform to the translational assumption inherent in block-based prediction. Another requirement for this translational model is that the spatial displacement for a certain temporal resolution must be limited; that is, the time difference between the frames from which the prediction is derived and the frame being predicted must be a relatively short amount of absolute time. These temporal resolution and motion limitations facilitate the identification and modeling of certain redundant video signal components that are present in the video stream.

In the present invention method, sequential PCA is combined with embedded zero-tree wavelet to further enhance the utility of the hybrid compression method. The sequential PCA technique provides a means by which conventional PCA can be enhanced for signals that have a temporal coherency or temporally local smoothness. The embedded zero-tree wavelet provides a means by which a locally smooth spatial signal can be decomposed into a space-scale representation in order to increase the robustness of certain processing and also the computational efficiency of the algorithm. For the present invention, these two techniques are combined to increase the representation power of the variance models and also provide a representation of those models that is compact and ordered such that much of the representational power of the basis is provided by a truncation of the basis.

In another embodiment, sequential PCA is applied with a fixed input block size and fixed tolerance to increase the weighted bias to the first and most energetic PCA components. For longer data sequences this first PCA component is often the only PCA component. This affects the visual quality of the reconstruction and can limit the utility of the described approach in some ways. The present invention employs a different norm for the selection of PCA components that is preferable to the use of the conventionally used least-square norm. This form of model selection avoids the over-approximation by the first PCA component.

In another embodiment, a block PCA process with a fixed input block size and prescribed number of PCA components per data block is employed to provide beneficial uniform reconstruction traded against using relatively more components. In a further embodiment, the block PCA is used in combination with sequential PCA, where block PCA reinitializes the sequential PCA after a set number of steps with a block PCA step. This provides a beneficial uniform approximation with a reduction in the number of PCA components.

In another embodiment, the invention capitalizes on the situation where the PCA components before and after encoding-decoding are visually similar. The quality of the image sequence reconstructions before and after encoding-decoding may also be visually similar and this often depends on the degree of quantization employed. The present inventive method decodes the PCA components and then renormalizes them to have a unit norm. For moderate quantization the decoded PCA components are approximately orthogonal. At a higher level of quantization the decoded PCA components are partially restored by application of SVD (not spelled out anywhere) to obtain an orthogonal basis and modified set of reconstruction coefficients.

In another embodiment, a variable and adaptable block size is applied with a hybrid sequential PCA method in order to produce improved results with regard to synthesis quality. The present invention bases the block size on a maximum number of PCA components and a given error tolerance for those blocks. Then, the method expands the current block size until the maximum number of PCA components is reached. In a further embodiment, the sequence of PCA components is considered as a data stream, which leads to a further reduction in the dimensionality. The method performs a post-processing step where the variable data blocks are collected for the first PCA component from each block and SVD is applied to further reduce the dimensionality. The same process is then applied to the collection of second, third, etc. components.

Various decomposition methods and mechanisms may be employed including but not limited to power factorization, generalized PCA, progressive PCA and combinations thereof. Examples are described in related U.S. patent application Ser. No. 11/396,010.

Sub-Band Temporal Quantization

An alternative embodiment of the present invention uses discrete cosine transform (DCT) or discrete wavelet transform (DWT) to decompose each frame into sub-band images. Principal component analysis (PCA) is then applied to each of these "sub-band" videos (images). The concept is that sub-band decomposition of a frame of video decreases the spatial variance in any one of the sub-bands as compared with the original video frame.

For video of a moving object (person), the spatial variance tends to dominate the variance modeled by PCA. Sub-band decomposition reduces the spatial variance in any one decomposition video.

For DCT, the decomposition coefficients for any one sub-band are arranged spatially into a sub-band video. For instance, the DC coefficients are taken from each block and arranged into a sub-band video that looks like a postage stamp version of the original video. This is repeated for all the other sub-bands, and the resulting sub-band videos are each processed using PCA.

For DWT, the sub-bands are already arranged in the manner described for DCT.

In a non-limiting embodiment, the truncation of the PCA coefficients is varied.

Wavelet

When a data is decomposed using the discrete wavelet transformation (DWT), multiple band pass data sets result at lower spatial resolutions. The transformation process can be recursively applied to the derived data until only single scalar values results. The scalar elements in the decomposed structure are typically related in a hierarchical parent/child fashion. The resulting data contains a multi resolution hierarchical structure and also finite differences as well.

When DWT is applied to spatial intensity fields, many of the naturally occurring images' phenomena are represented with little perceptual loss by the first or second low band pass derived data structures due to the low spatial frequency. Truncating the hierarchical structure provides a compact representation when high frequency spatial data is either no present or considered noise.

While PCA may be used to achieve accurate reconstruction with a small number of coefficients, the transform itself can be quite large. To reduce the size of this "initial" transform, an embedded zero tree (EZT) construction of a wavelet decomposition can be used to build a progressively more accurate version of the transformation matrix.

In a preferred embodiment, PCA is applied to normalized video data followed by DWT or other Wavelet transform. This results in compressed video data that retains saliency of video image objects.

Sub-Space Classification

As is well understood by those practiced in the art, discretely sampled phenomena data and derivative data can be represented as a set of data vectors corresponding to an algebraic vector space. These data vectors include, in a non-limiting way, the pels in the normalized appearance of the segmented object, the motion parameters and any structural positions of features or vertices in two or three dimensions. Each of these vectors exists in a vector space, and the analysis of the geometry of the space can be used to yield concise representations of the sampled, or parameter, vectors. Beneficial geometric conditions are typified by parameter vectors that form compact subspaces. When one or more subspaces are mixed, creating a seemingly more complex single subspace, the constituent subspaces can be difficult to discern. There are several methods of segmentation that allow for the separation of such subspaces through examining the data in a higher dimensional vector space that is created through some interaction of the original vectors (such as inner product).

Feature Subspace Classification

A feature subspace is constructed using a DCT decomposition of the region associated with an object. Each resulting coefficient matrix is converted into a feature vector. These feature vectors are then clustered spatially in the resulting vector space. The clustering provides groups of image object instances that can be normalized globally and locally toward some reference object instance. These normalized object instances can then be used as an ensemble for PCA.

In one preferred embodiment, the DCT matrix coefficients are summed as the upper and lower triangles of a matrix. These sums are considered as elements of a two dimensional vector.

In one preferred embodiment, the most dense cluster is identified and the vectors most closely associated with the cluster are selected. The pels associated with the object instances corresponding to these pels are considered most similar to each other. The selected vectors can then be removed from the subspace and a re-clustering can yield another set of related vectors corresponding to related object instances.

In a further embodiment, the image object instances associated with the identified cluster's vectors are globally normalized toward the cluster centroid. Should the resulting normalization meet the distortion requirements, then the object instance is considered to be similar to the centroid. A further embodiment allows for failing object instances to be returned to the vector space to be candidates for further clustering.

In another embodiment, clusters are refined by testing their membership against the centroids of other clustered object instances. The result is that cluster membership may change and therefore yield a refinement that allows for the clusters to yield object instance images that are most similar.

Ensemble Processing

The present inventive method may utilize an ensemble selection and processing. The method selects a small subset of images from the candidate training pool based on the deformation distance of the images from the key image in the pool.

In a preferred embodiment, the DCT intra cluster distance is used as the means of determining which of the candidate images will be used to represent the variance in the cluster.

A further embodiment projects images from different clusters into different PCA spaces in order to determine ensemble membership of the remaining images. The projection is preceded by a global and local normalization of the image relative to the key ensemble image or the ensemble average.

Object Encoding

One embodiment of the invention performs a Fourier subspace classification on an instance of a detected object to identify one or more candidate ensembles for encoding the object instance. The closest matching ensembles are then further qualified through global and local normalization of the image relative to the key ensemble image or the ensemble average. Upon identification of the ensemble for an image, the normalized image is then segmented and decomposed using the ensemble basis vectors. The resulting coefficients are the decomposed coefficients corresponding to the original object at the instance of time corresponding to the frame containing the object. These coefficients are also referred to as the appearance coefficients.

Sequence Reduction

The present inventive method has a means for further reducing the coding of images utilizing an interpolation of the decomposed coefficients. The temporal stream is analyzed to determine if sequences of the appearance and/or deformation parameters have differentials that are linear. If such is the case, then only the first and last parameters are sent with an indication that the intermediate parameters are to be linearly interpolated.

Tree Ensemble

The present invention has a preferred embodiment in which the ensemble is organized into a dependency tree that is brached based on similarity of pattern vectors. The "root" of the tree is established as the key pattern of the ensemble. Additional ensemble patterns are added to the tree and become "leaves" of the tree. The additional patterns are placed as dependents to whichever tree node is most similar to the pattern. In this way the ensemble patterns are organized such that a dependency structure is created based on similarity. This structure is utilized as an alternative to "Sequence Reduction", providing the same method with the difference that in stead of interpolating a sequence of pattern vectors, a traversal of the tree is used as an alternative to the temporal ordering.

Hybrid Spatial Normalization Compression

The present invention extends the efficiency of block-based motion predicted coding schemes through the addition of segmenting the video stream into two or more "normalized" streams. These streams are then encoded separately to allow the conventional codec's translational motion assumptions to be valid. Upon decoding the normalized streams, the streams are de-normalized into their proper position and composited together to yield the original video sequence.

In one embodiment, one or more objects are detected in the video stream and the pels associated with each individual object are subsequently segmented leaving non-object pels. Next, a global spatial motion model is generated for the object and non-object pels. The global model is used to spatially normalize object and non-object pels. Such a normalization has effectively removed the non-translational motion from the video stream and has provided a set of videos whose occlusion interaction has been minimized. These are both beneficial features of the present inventive method.

The new videos of object and the non-object, having their pels spatially normalized, are provided as input to a conventional block-based compression algorithm. Upon decoding of the videos, the global motion model parameters are used to de-normalize those decoded frames, and the object pels are composited together and onto the non-object pels to yield an approximation of the original video stream.

Figure 6:
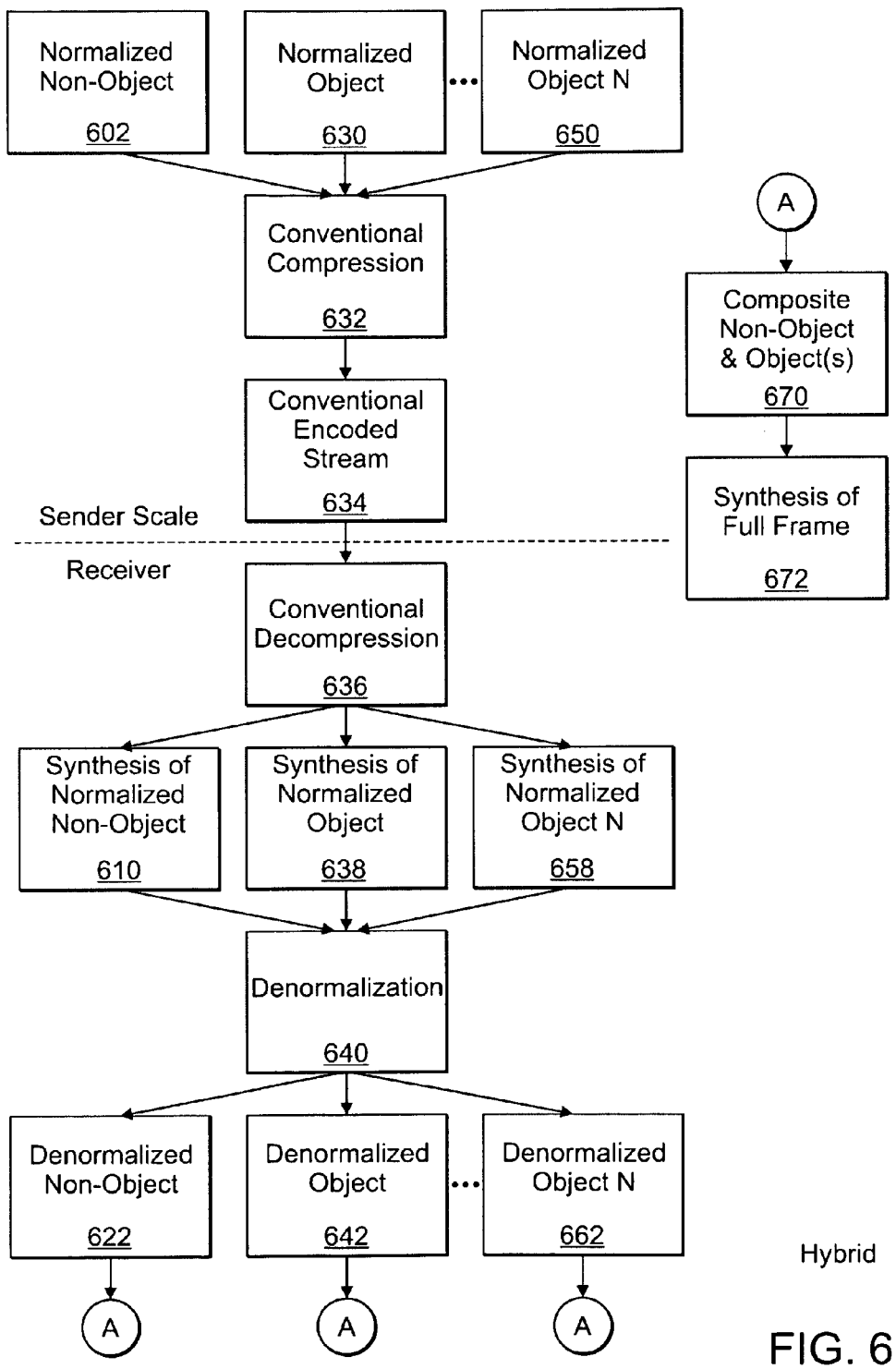
FIG. 6 is a block diagram illustrating the hybrid spatial normalization compression method.

As shown in FIG. 6, the previously detected object instances 206 and 208 for one or more objects 630 and 650 are each processed with a separate instance of a conventional video compression method 632. Additionally, the non-object 602 resulting from the segmentation 230 of the objects, is also compressed using conventional video compression 632. The result of each of these separate compression encodings 632 are separate conventional encoded streams for each 634 corresponding to each video stream separately. At some point, possibly after transmission, these intermediate encoded streams 234 can be decompressed 636 into a synthesis of the normalized non-object 610 and a multitude of objects 638 and 658. These synthesized pels can be de-normalized 640 into their de-normalized versions 622, 642 and 662 to correctly position the pels spatially relative to each other so that a compositing process 670 can combine the object and non-object pels into a synthesis of the full frame 672.

Two of the most prevalent compression techniques are the discrete cosine transform (DCT) and discrete wavelet transform (DWT). Error in the DCT transform manifests in a wide variation of video data values, and therefore, the DCT is typically used on blocks of video data in order to localize these false correlations. The artifacts from this localization often appear along the border of the blocks. In DWT, more complex artifacts occur when there is a mismatch between the basis function and certain textures, and this causes a blurring effect. To counteract the negative effects of DCT and DWT, the precision of the representation is increased to lower distortion at the cost of precious bandwidth.

In accordance with the present invention, a video image compression method (image processing method in general) is provided, which combines principal component analysis (PCA) and wavelet compression. In a preferred embodiment, parallel basis are built at both the sender and the receiver. With the present technique, the parallel basis becomes the original frames (anchor frames) used in the coding and decoding processes 632, 636. Specifically, basis information is sent to the receiver and is used to replicate the basis for additional frames. At encoder 634, PCA is applied and the dataset is reduced by applying a wavelet transform, while the basis is being transmitted. In particular, the PCA to wavelet compression process is an intermediate step that occurs while the basis are being transmitted to the receiver.

In another embodiment, a switching between encoding modes is performed based on a statistical distortion metric, such as PSNR (peak signal to noise ratio), that would allow conventional versus the subspace method to encode the frames of video.

In another embodiment of the invention, the encoded parameters of the appearance, global deformation (structure, motion and pose) and local deformation are interpolated to yield predictions of intermediate frames that would not otherwise have to be encoded. The interpolation method can be any of the standard interpolation methods such as linear, cubic, spline, etc.

Figure 14:
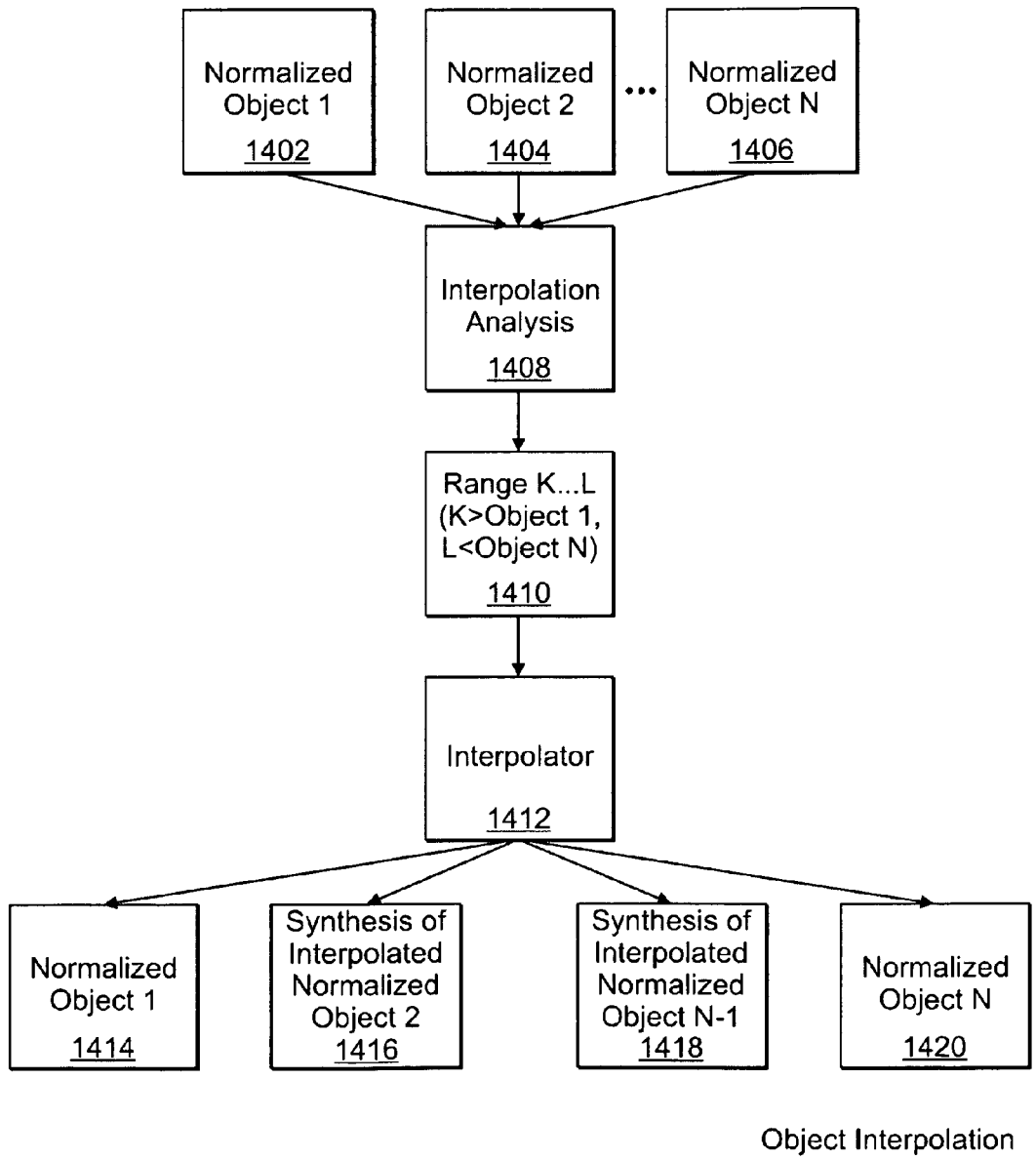
FIG. 14 is a block diagram illustrating the object interpolation method of the invention.

As shown in FIG. 14, the object interpolation method can be achieved through the interpolation analysis 1408 of a series of normalized objects 1402, 1404 and 1406 as represented by appearance and deformation parameters. The analysis determines the temporal range 1410 over which an interpolating function can be applied. The range specification 1410 can then be combined with the normalized object specifications 1414 and 1420 in order to approximate and ultimately synthesize the interim normalized objects 1416 and 1418.

Integration of Hybrid Codec

In combining a conventional block-based compression algorithm and a normalization-segmentation scheme, as described in the present invention, there are several inventive methods that have resulted. Primarily, there are specialized data structures and communication protocols that are required.

The primary data structures include global spatial deformation parameters and object segmentation specification marks. The primary communication protocols are layers that include the transmission of the global spatial deformation (global structural model) parameters and object segmentation specification masks.

Global Structure, Global Motion and Local Deformation Normalization Compression

In a preferred embodiment, the foregoing PCA/wavelet encoding techniques are applied to a preprocessed video signal to form a desired compressed video signal. The preprocessing reduces complexity of the video signal in a manner that enables PCA/wavelet encoding (compression) to be applied with increased effect. The image processing system 1500 of FIG. 10 is illustrative.

Figure 10:
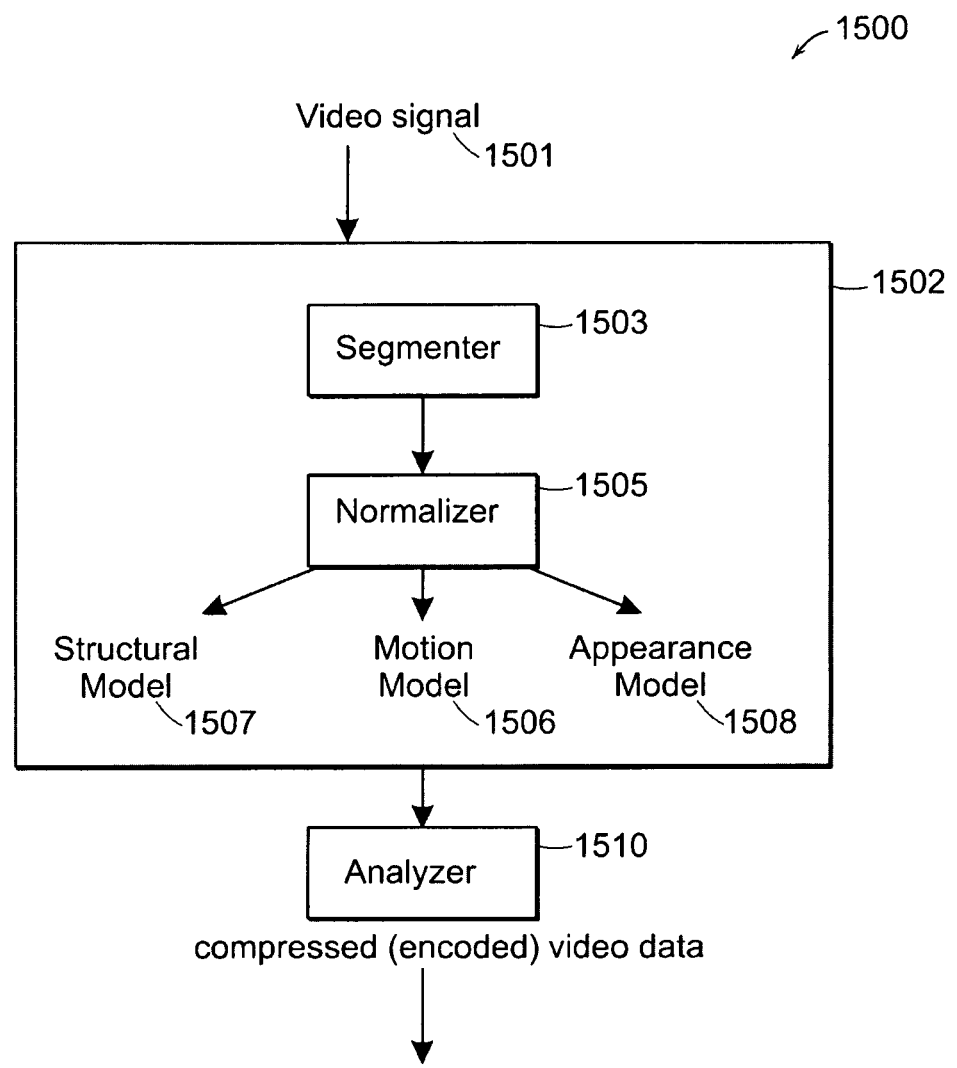
FIG. 10 is a block diagram of a preferred embodiment video compression (image processing, generally) system.

In FIG. 10, source video signal 1501 is input to or otherwise received by a preprocessor 1502. The preprocessor 1502 uses bandwidth consumption to determine components of interest (salient objects) in the source video signal 1501. In particular, the preprocessor 1502 determines portions of the video signal which use disproportionate bandwidth relative to other portions of the video signal 1501. One method or segmenter 1503 for making this determination is as follows.

Segmenter 1503 analyzes an image gradient over time and/or space using temporal and/or spatial differences in derivatives of pels as described above. In coherence monitoring, parts of the video signal that correspond to each other across sequential frames of the video signal are tracked and noted. The finite differences of the derivative fields associated with these coherent signal components are integrated to produce the determined portions of the video signal which use disproportionate bandwidth relative to other portions (i.e., determines the components of interest). In a preferred embodiment, if a spatial discontinuity in one frame is found to correspond to a spatial discontinuity in a succeeding frame, then the abruptness or smoothness of the image gradient is analyzed to yield a unique correspondence (temporal coherency). Further collections of such correspondences are also employed in the same manner to uniquely attribute temporal coherency of discrete components of the video frames. For an abrupt image gradient, an edge is determined to exist. If two such edge defining spatial discontinuities exist then a corner is defined. These identified spatial discontinuities are combined with the gradient flow which produces motion vectors between corresponding pels across frames of the video data. When a motion vector is coincident with an identified spatial discontinuity, then the invention segmenter 1503 determines that a component of interest (salient object) exists.

Other segmentation techniques as described in previous sections are suitable for implementing segmenter 1503. For example, face/object detection may be used.

Returning to FIG. 10, once the preprocessor 1502 (segmenter 1503) has determined the components of interest (salient objects) or otherwise segmented the same from the source video signal 1501, a normalizer 1505 reduces the complexity of the determined components of interest. Preferably the normalizer 1505 removes variance of global motion and pose, global structure, local deformation, appearance and illumination (appearance variance) from the determined components of interest. The normalization techniques previously described herein are utilized toward this end. This results in the normalizer 1505 establishing a structural model 1507 and an appearance model 1508 of the components of interest.

The structural model 1507 may be mathematically represented as:

$$SM(\sigma) = \sum_{x,y} [(v_{x,y} + \Delta_t) + Z] \qquad \text{Equation 1}$$

where σ is the salient object (determined component of interest) and SM( ) is the structural model of that object;

$v_{x,y}$ are the 2D mesh vertices of a piece-wise linear regularized mesh over the object a registered over time (discussed above);

Δt are the changes in the vertices relative to each other over time t representing scaling (or local deformation), rotation and translation of the object between video frames; and Z is global motion (i.e., movement of the whole meshing and deformation of the mesh). In some embodiments, Z represents position of the 2D mesh in space and pose of the mesh represented by three rotational parameters.

From Equation 1, applicant derives a global rigid structural model, global motion, pose and locally derives deformation of the model as discussed in FIG. 4. Rigid local deformation aspects are defined by position of each mesh vertex in space. Non-rigid local deformation is expressed in correlation of the vertices across video frames. Independent motion of the vertices is also correlated, resulting in a low (efficient) dimension motion model. Known techniques for estimating structure from motion are employed and are combined with motion estimation to determine candidate structure for the structural parts of the component of interest of the video frame over time. This results in defining the position and orientation of the salient object in space and hence provides a structural model 1507 and motion model 1506.

In one embodiment, motion estimates are constrained by deformation models, a structural model 1507 and illumination (appearance variance) model. Structure from motion techniques are used to determine changes in object pose/position from one video frame to another. An LRLS (see below) or other bilinear tracker tracks the candidate object structure over time. The tracker determines object pose/position changes (Δ's) for each frame as predictions to the 2D motion estimation.

The appearance model 1508 then represents characteristics and aspects of the salient object which are not collectively modeled by the structural model 1507 and motion model 1506. In one embodiment, the appearance model 1508 is a linear decomposition of structural changes over time and is defined by removing global motion and local deformation from the structural model 1507. Applicant takes object appearance at each video frame and using the structural model 1507 reprojects to a "normalized pose". The "normalized pose" is also referred to as one or more "cardinal" poses. The reprojection represents a normalized version of the object and produces any variation in appearance. As the given object rotates or is spatially translated between video frames, the appearance is positioned in a single cardinal pose (i.e., the average normalized representation). The appearance model 1508 also accounts for cardinal deformation of a cardinal pose (e.g., eyes opened/closed, mouth opened/closed, etc.) Thus appearance model 1508 AM(σ) is represented by cardinal pose $P_c$ and cardinal deformation $\Delta_c$ in cardinal pose $P_c$, $$AM(\sigma) = \sum_t (P_c + \Delta_c P_c) \qquad \text{Equation 2}$$

The pels in the appearance model 1508 are preferably biased based on their distance and angle of incidence to camera projection axis. Biasing determines the relative weight of the contribution of an individual pel to the final formulation of a model. Tracking of the candidate structure (from the structural model 1507) over time can form or enable a prediction of the motion of all pels by implication from a pose, motion and deformation estimates. This is due in part by the third dimension (Z) in the structural model 1507. That third dimension allows for the 2D mesh to be tracked over more video frames combining more objects from different frames to be represented by the same appearance model 1508. Further, the third dimension allows for the qualification of the original pels relative to their orientation with the sensor array of the camera. This information is then used to determine how much any particular pel contributes to an appearance model 1508.

Lastly, object appearance is normalized from different frames based on each dimension. That is, the present invention resolves three dimensions and preferably uses multiple normalization planes to model the appearance. For example, normalizer 1505 removes variance of global motion (Z) and pose, global structure, local deformation and illumination (appearance variance) as described above.

Further, with regard to appearance variance (appearance and illumination modeling), one of the persistent challenges in image processing has been tracking objects under varying lighting conditions. In image processing, contrast normalization is a process that models the changes range of pixel intensity values as attributable to changes in the lighting/illumination rather than to other factors. The preferred embodiment estimates a salient object's arbitrary changes in illumination conditions under which the video was captured (i.e., modeling, illumination incident on the object). This is achieved by combining principles from Lambertian Reflectance Linear Subspace (LRLS) theory with optical flow. According to the LRLS theory, when an object is fixed only allowing for illumination changes, the set of the reflectance images can be approximated by a linear combination of the first nine spherical harmonics; thus the image lies close to a 9D linear subspace in an ambient "image" vector space. In addition, the reflectance intensity I for an image pixel (x,y) can be approximated as follows.

$$I(x, y) = \sum_{i=0,1,2} \sum_{j=-i, -i+1 \ldots i-1, i} l_{ij} b_{ij}(n),$$

In accordance with aspects of the present invention, using LRLS and optical flow, expectations are computed about how lighting interacts with the object. These expectations serve to constrain the possible object motion that can explain changes in the optical flow field. When using LRLS to describe the appearance of the object using illumination modeling, it is still necessary to allow an appearance model to handle any appearance changes that may fall outside of the illumination model's predictions.

With the present technique, a succeeding video frame in a sequence of frames can be predicted and then principal component analysis (PCA) can be performed. In this way, a very generalized form of the image data can be built and then PCA can be performed on the remainder of the data.

Other mathematical representations of the appearance model 1508 and structural model 1507 are suitable as long as the complexity of the components of interest is substantially reduced from the corresponding original video signal but saliency of the components of interest is maintained.

Returning to FIG. 10, PCA/wavelet encoding (described above) is then applied to the structural model 1507 and appearance model 1508 by analyzer 1510. More generally, analyzer 1510 employs a geometric data analysis to compress (encode) the video data corresponding to the components of interest. The resulting compressed (encoded) video data is usable in the FIG. 6 image processing system described above. In particular, the models 1506, 1507, 1508 are preferably stored at the encoding and decoding sides 632, 636 of FIG. 6. From the structural model 1507 and appearance model 1508, a finite state machine is generated. The conventional coding 632 and decoding 636 can also be implemented as a conventional wavelet video coding-decoding scheme. This wavelet scheme can be employed to synthesize video data while maintaining saliency of objects/components of interest. In one embodiment, during training, for a given video data, the finite state machine linearly decomposes appearance using wavelet transform techniques and outputs a normalized (MPEG or similar standard) video compression stream. During image processing time, the finite state machine on both sides 632, 636 interpolates pel data (as described above) and produces a compressed form of the video data. In this way the invention state machine synthesizes video data while maintaining saliency of objects/components of interest.

As discussed above, PCA encoding (or other linear decomposition) is applied to the normalized pel data on both sides 632 and 636 which builds the same set of basis vectors on each side 632, 636. In a preferred embodiment, PCA/wavelet is applied on the basis function during image processing to produce the desired compressed video data. Wavelet techniques (DWT) transform the entire image and sub-image and linearly decompose the appearance model 1508 and structural model 1507, then this model is truncated gracefully to meet desired threshold goals (ala ECT or SPIHT). This enables scalable video data processing unlike systems/methods of the prior art due to the "normalized" nature of the video data.

Further, given a single pel of one frame of video data, the image processing system 1500 of the present invention is able to predict the succeeding frame (parameters thereof) due to the application of PCA/wavelet compression on the structural model 1507 and/or the appearance model 1508.

Accordingly, the present invention may be restated as a predictive model. Once the appearance model 1508 and structural model 1507 are established as described above, application of geometric data analysis techniques (e.g., sequential PCA, power factorization, generalized PCA, progressive PCA combining PCA/wavelet transform, and the like) to at least the appearance model 1508 provides encoded video data (sequence of frames) of the components of interest.

In further embodiments, the image processing system of the present invention may be represented in spherical terms instead of 3D mesh terms. Each component of interest is represented by respective ellipsoids that contain data from the linear decomposition. For a given component of interest, the minor axis of the ellipsoid defines appearance model 1508 basis vectors and the major axis defines structural model 1507 basis vectors. Other ellipsoids are suitable such as hyper ellipsoids. Implicit in this elliptical representation is motion estimation, a deformation model and an illumination model sufficient to maintain saliency of objects. As a result, an implicit representation provides for a much more compact encoding of the video data corresponding to the components of interest.

Virtual Image Sensor

"Illumination" of an object is the natural phenomena of light falling incident on the object. The illumination changes as a function of $\theta$ angle of incidence and I light intensity (of the reflectance). A camera (or image sensor generally) effectively samples and records the illumination of the object. The result is a photographic image (e.g., still snapshot or sequence of video frames) of the object. The pels in the sample image are attributed to a certain value of $\theta$ (angle of incidence) and a certain value of I (light reflectance intensity). For different values of $\theta$ and/or I, each pel takes on a respective different data value. For each pel in the image (or at least for salient objects in the image), the present invention models the possible pel data values for different values of $\theta$ and I. Using this model, one can determine the subject object's motion, position and pose in a succeeding video or image data frame given the change in illumination of one pel (i.e., the difference in that pel's data value between the current video or image data frame and the succeeding video or image data frame).

Accordingly, the present invention provides a virtual image sensor, preferably a different virtual sensor for different data. The virtual image sensor is built according to aspects (quality, representation limits, etc.) of the respective data. The virtual image sensor discretely isolates information from the respective image data (i.e., segments and normalizes or otherwise removes variance), and that information is sufficient to retain saliency or quality of the uncompressed (decoded) version of the data.

Figure 11:
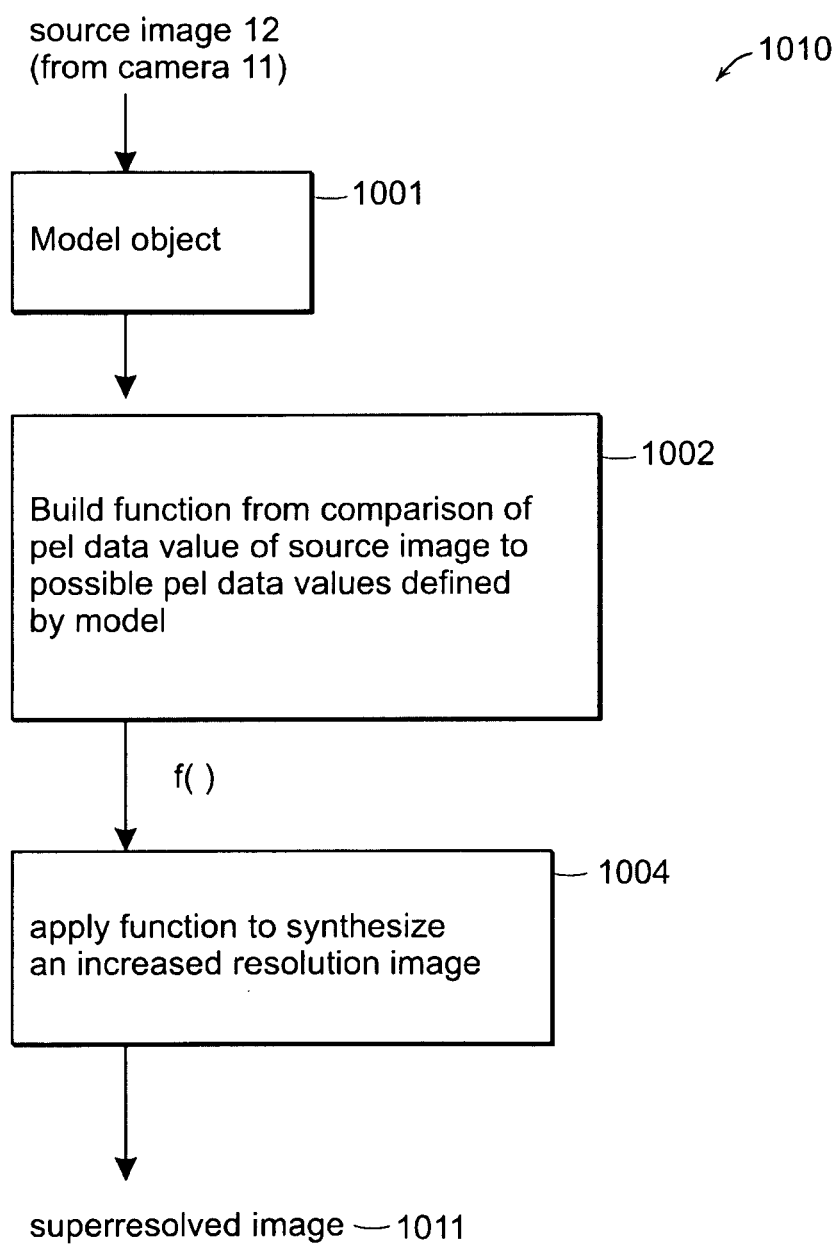
FIG. 11 is a flow diagram illustrating a virtual image sensor of the present invention.

A preferred embodiment of the virtual image sensor 1010 of the present invention is illustrated in FIG. 11. Source image 12 data (an image data frame) is received at step 1001. In response, step 1001 applies the above described object detection, segmentation and normalization techniques of preprocessor 1502 to form a model 1507, 1508 of the salient objects (components of interest) in the image data. The model 1507, 1508 includes Lambertian modeling of how facets (pels) illuminate and the corresponding possible pel data values for different values of $\theta$ and I.

For a given pel in the source image 12, step 1002 analyzes the range of possible data values defined by the model 1507, 1508 and compares the current data value as produced by the source camera 11 to the model data values, especially those representing a theoretical best resolution. This step 1002 is repeated for other pels in the image data. Based on the comparisons, step 1002 determines a relationship between the source camera's 11 resolution and a theoretic super resolution as defined by the model 1507, 1508. Step 1002 represents this relationship as a function.

Step 1004 applies the resulting function of step 1002 to the source image 12 and extrapolates or otherwise synthesizes an increased resolution image 1011. Preferably step 1004 produces a super resolved image 1011 of the source image 12.

In this way the present invention provides a virtual image sensor 1010. It is noted that the compressed (parameterized version of) data in the model 1507, 1508 enables such processing (extrapolations and synthesizing).

Figure 2A:
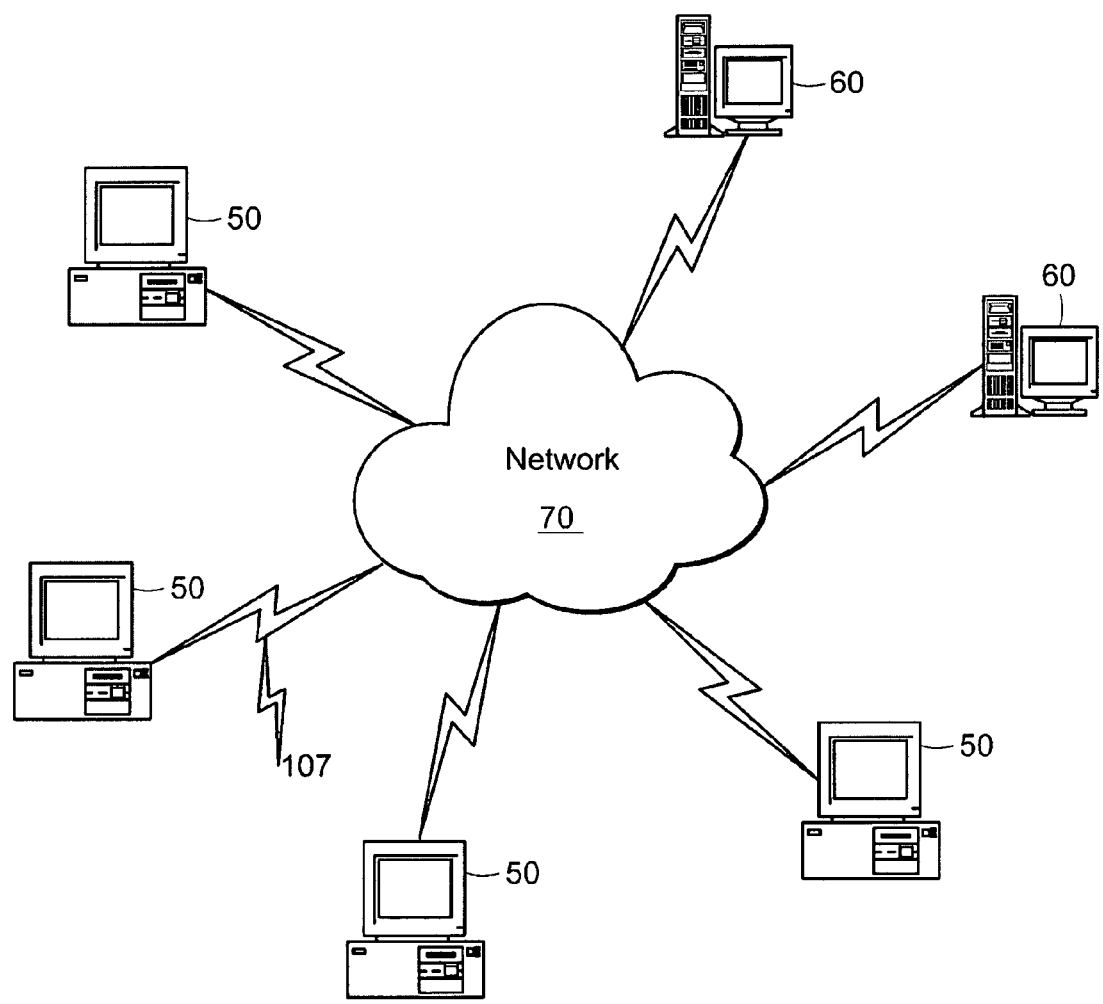
FIGS. 2a and 2b are schematic and block diagrams of a computer environment in which embodiments of the present invention operate.

FIG. 2a illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2B:
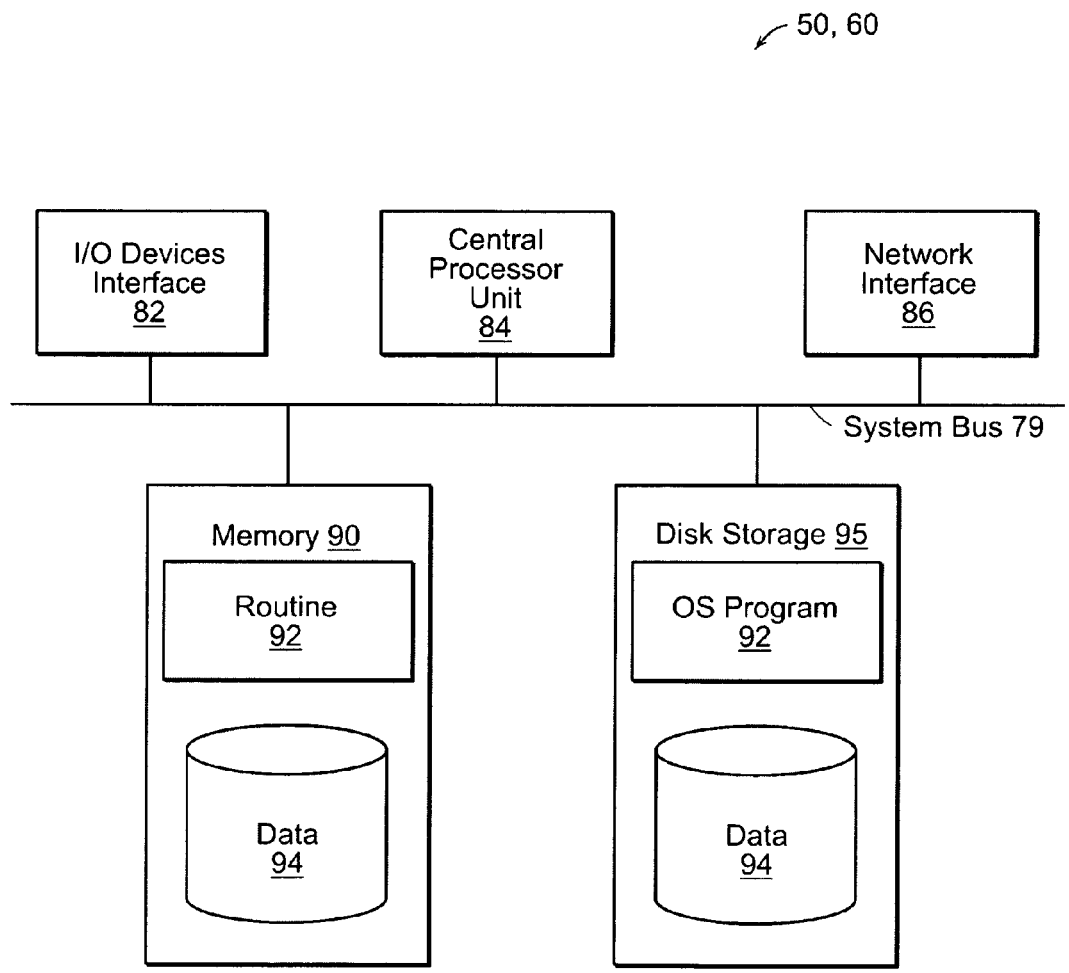

FIG. 2b is a diagram of the internal structure of a computer (e.g., client processor/device 50 or server computers 60) in the computer system of FIG. 2a. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2a). Memory 90 provides volatile storage for computer software instructions 92 and data 94 used to implement an embodiment of the present invention (e.g., linear decomposition, spatial segmentation, spatial normalization and other processing of FIG. 2 and other figures detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method for video data compression, comprising the steps of:
   processing a video signal to determine bandwidth consumption of portions of the video signal;
   using the determined bandwidth consumption, detecting a portion of the video signal that uses a disproportionate amount of bandwidth compared to one or more other portions of the video signal, the detected portion of the video signal resulting in determined components of interest, which are detected objects in the video signal;
   modeling invariant portions of the determined components of interest; and
   normalizing the modeled invariant portions of the determined components of interest to generate an intermediate form of the components of interest, the intermediate form representing the components of interest reduced in complexity enabling a compressed form of the video signal through linear decomposition, where the determined components of interest maintain saliency.

2. A method as in claim 1 wherein
   the video signal is a sequence of frames; and
   the step of detecting a portion of the video signal that uses a disproportionate amount of bandwidth compared to one or more other portions of the video signal includes at least one of:
   (i) analyzing image gradients across one or more frames where image gradient is a first derivative model and gradient flow is a second derivative,
   (ii) integrating finite differences of pels temporally or spatially to form a derivative model,
   (iii) analyzing an illumination field across one or more frames, and
   (iv) predictive analysis, to determine bandwidth consumption, the determined bandwidth consumption being used to determine the components of interest.

3. A method as in claim 1 wherein the determined components of interest contain structural information including one or more of spatial features and correspondence of spatial features (motion).

4. A method as in claim 3 wherein the spatial features further include one or more of edges, corners, pixels, spatial patterns and derived patterns (SIFT).

5. A method as in claim 1 wherein modeling invariant portions of the determined components of interest involves forming one or more of a structural model or an appearance model of the determined components of interest.

6. A method as in claim 5 further comprising the step of applying geometric data analysis techniques to at least the appearance model, wherein the reduction in complexity of the components of interest enabling improved application of geometric data analysis.

7. A method as in claim 5 further comprising the step of applying geometric data analysis techniques to at least the structural model, wherein the reduction in complexity of the components of interest enables enabling improved application of geometric data analysis.

8. A method as claimed in claim 1 wherein the certain variance is one or more of global structure, global motion and pose, local deformation and illumination.

9. A method as in claim 8 further comprising the step of applying geometric data analysis techniques to the generated intermediate form, wherein the intermediate form provides a representation of the components of interest having a the reduction in complexity, of the components of interest enables improved application of geometric data analysis.

10. A method as claimed in claim 9 wherein the geometric data analysis techniques include the linear decomposition or nonlinear decomposition.

11. A method as claimed in claim 10 wherein the linear decomposition employs one or more of: sequential PCA, power factorization, generalized PCA, and progressive PCA.

12. A method as claimed in claim 11 wherein progressive PCA includes wavelet transform techniques combined with PCA.

13. A computer implemented method as claimed in claim 1 wherein the step of encoding, further including encoding, with respect to certain variance, the determined components of interest to generate the intermediate form of the components of interest, where the certain variance is one or more of global structure, global motion and pose, local deformation and illumination.

14. Apparatus for video data compression, comprising:
a detector configured to use bandwidth consumption of portions of a video signal to determine components of interest, including detecting a portion of the video signal that uses a disproportionate amount of bandwidth compared to one or more other portions of the video signal, resulting in determined components of interest, which are detected ob objects;
a modeler configured to model invariant portions of the determined components of interest and;
a normalizer configured to normalize the modeled invariant portions of the determined components of interest to generate an intermediate form of the components of interest, the intermediate form representing the components of interest reduced in complexity and enabling a compressed form of the video signal through linear decomposition, where the determined components of interest maintain saliency.

15. Apparatus as claimed in claim 14 wherein
the video signal is a sequence of frames; and
the detector further performs at least one of:
(i) analyzing image gradients across one or more frames where image gradient is a first derivative model and gradient flow is a second derivative,
(ii) integrating finite differences of pels temporally or spatially to form a derivative model,
(iii) analyzing an illumination field across one or more frames, and
(iv) predictive analysis, to determine bandwidth consumption, the determined bandwidth consumption being used to determine the components of interest.

16. Apparatus as claimed in claim 14 wherein the normalizer forms a structural model and an appearance model of the determined components of interest.

17. Apparatus as claimed in claim 16 further comprising an analyzer, the analyzer applying geometric data analysis to at least one of the appearance model and the structural model, wherein the intermediate form provides a representation of the components of interest having a reduction in complexity, the components of interest enabling improved application of geometric data analysis.

18. Apparatus as claimed in claim 14 wherein the certain variance is one or more of global structure, global motion and pose, local deformation and illumination.

19. Apparatus as claimed in claim 14 further comprising an analyzer, the analyzer applying geometric data analysis techniques to the intermediate form, wherein the intermediate form provides a representation of the components of interest having a reduction in complexity, the components of interest enabling improved application of geometric data analysis;
wherein the geometric data analysis techniques include any of linear decomposition and nonlinear decomposition, and
wherein the linear decomposition employs any of: sequential PCA, power factorization, generalized PCA, and progressive PCA.

20. Apparatus as claimed in claim 19 wherein progressive PCA includes wavelet transform techniques combined with PCA.

21. Apparatus for video data compression, comprising;
an object detector configured to process a video signal to determine bandwidth consumption of portions of the video signal, the object detector configured to detect portions of a video signal for encoding, the detector filtering the video signal for one or more portions using a disproportionate amount of bandwidth compared to one or more other portions of the video signal, where the detected portion of the video signal is a determined component of interest, which is a detected object, for use in encoding by an encoder;
a modeler configured to model invariant portions of the determined components of interest; and
the encoder configured to process the modeled invariant portions of the determined components of interest having a disproportionate amount of bandwidth to generate an intermediate form of the invariant portions of the determined components of interest, the encoder configured to encode the intermediate form into a compressed form through linear decomposition.

22. Apparatus as in claim 21 wherein the intermediate form provides a representation of the components of interest having a reduction in complexity as compared to its original form detected in the video signal, the components of interest enabling improved application of geometric data analysis.

23. Apparatus as claimed in claim 21 wherein the encoder is configured to normalize the modeled invariant portions of the determined components of interest to generate the intermediate form of the components of interest, where the modeled invariant portions of the determined components of interest model global structure, global motion and pose, local deformation and illumination.

24. A computer implemented method of video data compression, comprising:
processing a video signal to determine bandwidth consumption of portions of the video signal;
detecting portions of the video signal by filtering the video signal for one or more portions using a disproportionate amount of bandwidth compared to one or more other portions of the video signal, where the detected portion of the video signal is a determined component of interest for use in encoding, which is a detected object;

modeling invariant portions of the determined components of interest;

processing the modeled invariant portions of the determined components of interest to generate an intermediate form of the determined components of interest; and using the intermediate form of the invariant portions of the determined components of interest to provide an encoding through linear decomposition, the resulting linear decomposition encoding providing a compressed form of the invariant portions of the determined components of interest.

25. A computer implemented method as claimed in claim 24 wherein the intermediate form provides a representation of the components of interest having a reduction in complexity as compared to its original form detected in the video signal, the components of interest enabling improved application of geometric data analysis.

26. Apparatus for video data compression, comprising:

an object detector configured to process a video signal to determine bandwidth consumption of portions of the video signal, the object detector configured to detect portions of the video signal using a disproportionate amount of bandwidth compared to one or more other portions of the video signal, where each of the detected portions of the video signal is a component of interest being a detected object;

a modeler configured to model invariant portions of the components of interest requiring a disproportionate amount of bandwidth; and an encoder configured to process the modeled invariant portions of the determined components of interest requiring a disproportionate amount of bandwidth into a linear subspace suitable for linear decomposition to generate an encoded form of the determined components of interest.

27. A computer implemented method of video data compression, comprising:

processing a video signal to determine bandwidth consumption of portions of the video signal;

detecting components of interest in the video signal by filtering the video signal for one or more portions using a disproportionate amount of bandwidth compared to one or more other portions of the video signal, where the detected portion of the video signal is a determined component of interest for use in decoding, which is a detected object;

modeling invariant portions of the components of interest requiring a disproportionate amount of bandwidth; and normalizing the invariant portions of the determined components of interest requiring a disproportionate amount of bandwidth into a linear subspace suitable to generate a compressed form of the determined components of interest via linear decomposition.

28. A video data encoder comprising:

an encoder stored on a non-transitory computer readable medium, the encoder configured to process a video signal to determine bandwidth consumption of portions of the form of the video signal, the encoder configured to detect components of interest in the video signal for encoding by filtering the video signal for one or more portions using a disproportionate amount of bandwidth compared to one or more other portions of the video signal, where the detected portion of the video signal using a disproportionate amount of bandwidth is a determined component of interest for use in encoding, the determined component of interest resulting in a detected object; and the encoder configured to model invariant portions of the determined components of interest requiring a disproportionate amount of bandwidth, the modeled invariant portions of the determined components of interested being processed into a linear subspace to enable an encoded compressed form of the determined components of interest through linear decomposition for use in encoding the video signal.

29. A video processing system comprising:

an object detector stored on a non-transitory computer readable medium, the object detector configured to detect portions of video signal for objects of interest by filtering the video signal based on bandwidth consumption to identify one or more portions using a disproportionate amount of bandwidth compared to one or more other portions of the video signal, where a respective detected portion of the video signal is a determined component of interest;

a modeler configured to model the determined components of interest requiring a disproportionate amount of bandwidth using deformation and appearance models;

a normalizer configured to normalize the determined components of interest models to enable encoding through linear decomposition; and the encoder configured to encode the normalized determined components of interest requiring to generate an encoded form of the determined components of interest through linear decomposition, such that the resulting encoding provides a compressed form of the determined components of interest of the video signal, where the determined components of interest maintain saliency.

* * * * *